US011613380B1

(12) United States Patent
Foland et al.

(10) Patent No.: US 11,613,380 B1
(45) Date of Patent: Mar. 28, 2023

(54) SYSTEM AND METHOD FOR AIRCRAFT RECOMMENDATION FOR AN ELECTRIC AIRCRAFT

(71) Applicant: BETA AIR, LLC, South Burlington, VT (US)

(72) Inventors: Steven J. Foland, Garland, TX (US); Lochie Ferrier, Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/524,327

(22) Filed: Nov. 11, 2021

(51) Int. Cl.
*B64D 45/00* (2006.01)
*G08G 5/00* (2006.01)

(52) U.S. Cl.
CPC ............. *B64D 45/00* (2013.01); *G08G 5/003* (2013.01); *G08G 5/0004* (2013.01)

(58) Field of Classification Search
CPC ....... B64D 45/00; G08G 5/0004; G08G 5/003
See application file for complete search history.

(56) References Cited

U.S. PATENT DOCUMENTS

| | | | |
|---|---|---|---|
| 7,346,437 | B2 | 3/2008 | Petillon |
| 9,156,567 | B2 | 10/2015 | Covington et al. |
| 9,494,937 | B2 | 11/2016 | Siegel et al. |
| 9,542,851 | B1 | 1/2017 | Kim et al. |
| 10,332,405 | B2 | 6/2019 | Kopardekar |
| 2010/0168937 | A1 | 7/2010 | Soijer et al. |
| 2014/0018980 | A1* | 1/2014 | Bollapragada ....... G08G 5/0091 |
| | | | 244/180 |
| 2014/0379177 | A1* | 12/2014 | Takasaki ................... F02C 9/00 |
| | | | 701/14 |
| 2018/0292231 | A1* | 10/2018 | Delle-Vedove ........ B64D 43/00 |
| 2019/0130769 | A1 | 5/2019 | Rodriguez Bravo et al. |
| 2019/0302805 | A1 | 10/2019 | High et al. |
| 2020/0026307 | A1* | 1/2020 | Lax ...................... G08G 5/0021 |

(Continued)

FOREIGN PATENT DOCUMENTS

| | | |
|---|---|---|
| TR | 201900552 A2 * | 3/2019 |
| WO | 2017160736 A2 | 9/2017 |
| WO | 2021133379 A1 | 7/2021 |

OTHER PUBLICATIONS

English translation of TR 201900552 A2 (Year: 2019).*

(Continued)

*Primary Examiner* — Shon G Foley
(74) *Attorney, Agent, or Firm* — Caldwell Intellectual Property Law

(57) ABSTRACT

A system for aircraft recommendation for an electric aircraft is presented. The system includes a computing device, wherein the computing device is configured to, receive an aircraft datum, receive a flight plan, generate a model of at least a flight phase as a function of the aircraft datum and the flight plan, generate an aircraft recommendation as a function of the flight plan and aircraft datum, wherein generating the aircraft recommendation further comprise identifying a tunable parameter of the at least a flight phase, tuning the tunable parameter as a function of the model of the at least a flight phase and at least an objective constraint, and generating the aircraft recommendation as a function of the tuning. The system further includes a user device, wherein the user device is configured to display the aircraft recommendation.

20 Claims, 10 Drawing Sheets

(56) References Cited

U.S. PATENT DOCUMENTS

2020/0079532 A1   3/2020  Rix et al.
2020/0326729 A1  10/2020  Ham et al.
2020/0372809 A1  11/2020  Ganti et al.
2021/0409272 A1* 12/2021  Leal Herrera ...... H04L 41/0876

OTHER PUBLICATIONS

Dard et al., Machine Learning to Recommended Flight Reroutes, Jun. 15, 2019.

Anna Achenbach, Predictive Analytics in Airline Operations, Apr. 30, 2018.

\* cited by examiner

SYSTEM AND METHOD FOR AIRCRAFT RECOMMENDATION FOR AN ELECTRIC AIRCRAFT

FIELD OF THE INVENTION

The present invention generally relates to the field of performance improvement. In particular, the present invention is directed to a system and method for aircraft recommendation for an electric aircraft.

BACKGROUND

With the advent of electric aircrafts becoming more accessible to individual consumers at a smaller scale, the development and adaptation for improvements for the operation of the electric aircrafts may aid in individual consumers managing and monitoring electric aircrafts.

SUMMARY OF THE DISCLOSURE

In an aspect, a system for aircraft recommendation for an electric aircraft is presented. The system includes a computing device, wherein the computing device is configured to, receive an aircraft datum, receive a flight plan, generate a model of at least a flight phase as a function of the aircraft datum and the flight plan, generate an aircraft recommendation as a function of the flight plan and aircraft datum, wherein generating the aircraft recommendation further comprise identifying a tunable parameter of the at least a flight phase, tuning the tunable parameter as a function of the model of the at least a flight phase and at least an objective constraint, and generating the aircraft recommendation as a function of the tuning. The system further includes a user device, wherein the user device is configured to display the aircraft recommendation.

In another aspect, a method for aircraft recommendation for an electric aircraft is presented, the method includes receiving, by a computing device, an aircraft datum, receiving, by the computing device, a flight plan, generating a model of at least a flight phase as a function of the aircraft datum and the flight plan, generating an aircraft recommendation as a function of the flight plan and aircraft datum, wherein generating the aircraft recommendation further comprises identifying a tunable parameter of the at least a flight phase, tuning the tunable parameter as a function of the model of the at least a flight phase and at least an objective constraint, and generating the aircraft recommendation as a function of the tuning. The method further comprise displaying, by a user device, the aircraft recommendation.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
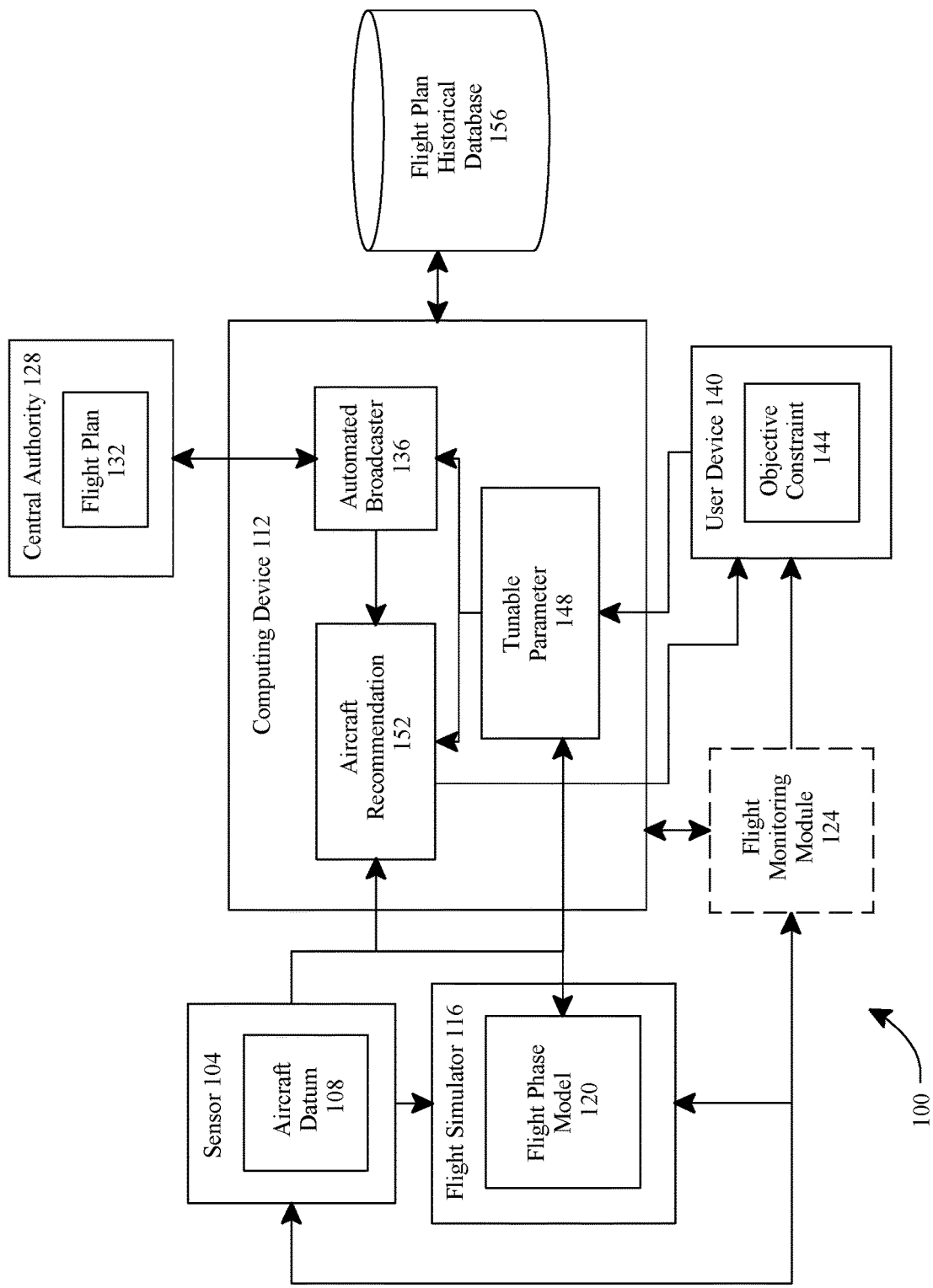
FIG. 1 is a block diagram of an exemplary embodiment of a system for aircraft recommendation for an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for aircraft recommendation for an electric aircraft. Aspects of the present disclosure can be used for any aircraft including, but not limited to, an electric vertical take-off and landing (eVTOL) aircraft. In an embodiment, the present disclosure can be used to detect and measure a plurality of physical and performance data surrounding the electric aircraft and generate a plurality of potential performance improvement recommendations to a user in view of a flight plan. The plurality of recommendations may include recommendations prioritizing specific qualities including, but not limited to, battery longevity, time of flight to destination, reroute to a recharging location, flight plan based on optimization for specific type of battery, and the like thereof.

Aspects of the present disclosure can be used to interact with users via a consumer tool, wherein the present disclosure may incorporate user preference and inputs in the generation of an aircraft recommendation. Aspects of the present disclosure can also be used to generate the aircraft recommendation in a visual simulation. This is so, at least in part, to provide a visual form of the aircraft recommendation along with various recommendation information. Aspects of the present disclosure allow for users to view the aircraft recommendation on a user device which includes an interactive display that may also allow users to input additional information, preferences, issues and complaints, and the like thereof, which are considered in generating an aircraft recommendation. Exemplary embodiments illustrating aspects of the present disclosure are described below in the context of several specific examples.

Referring now to FIG. 1, an exemplary embodiment of a system 100 for an aircraft recommendation for an electric aircraft is illustrated. System includes computing device 112. In a non-limiting embodiment, computing device 112 may include a flight controller. Computing device 112 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Computing device 112 may include a single computing device operating independently, or may include two or more computing device operating in concert, in parallel, sequentially or the like; two or more computing devices may be included together in a single computing device or in two or more computing devices. Computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 112 may include but is not limited to, for example, a computing device or cluster of computing devices in a first location and a second computing device or cluster of computing devices in a second location. Computing device 112 may include one or more computing devices dedicated to data storage, security, distribution of traffic for load balancing, and the like. Computing device 112 may distribute one or more computing tasks as described below across a plurality of computing devices of computing device, which may operate in parallel, in series, redundantly, or in any other manner used for distribution of tasks or memory between computing devices. Computing device 112 may be implemented using a "shared nothing" architecture in which data is cached at the worker, in an embodiment, this may enable scalability of system 100 and/or computing device.

With continued reference to FIG. 1, computing device 112 may be designed and/or configured to perform any method, method step, or sequence of method steps in any embodiment described in this disclosure, in any order and with any degree of repetition. For instance, computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 112 and/or the flight controller may be controlled by one or more Proportional-Integral-Derivative (PID) algorithms driven, for instance and without limitation by stick, rudder and/or thrust control lever with analog to digital conversion for fly by wire as described herein and related applications incorporated herein by reference. A "PID controller", for the purposes of this disclosure, is a control loop mechanism employing feedback that calculates an error value as the difference between a desired setpoint and a measured process variable and applies a correction based on proportional, integral, and derivative terms; integral and derivative terms may be generated, respectively, using analog integrators and differentiators constructed with operational amplifiers and/or digital integrators and differentiators, as a non-limiting example. A similar philosophy to attachment of flight control systems to sticks or other manual controls via pushrods and wire may be employed except the conventional surface servos, steppers, or other electromechanical actuator components may be connected to the cockpit inceptors via electrical wires. Fly-by-wire systems may be beneficial when considering the physical size of the aircraft, utility of for fly by wire for quad lift control and may be used for remote and autonomous use, consistent with the entirety of this disclosure. The computing device may harmonize vehicle flight dynamics with best handling qualities utilizing the minimum amount of complexity whether it be additional modes, augmentation, or external sensors as described herein.

With continued reference to FIG. 1, system 100 may include sensor 104. A "sensor," for the purposes of this disclosure, is an electronic device configured to detect, capture, measure, or combination thereof, a plurality of external and electric vehicle component quantities. Sensor 104 may be integrated and/or connected to at least an actuator, a portion thereof, or any subcomponent thereof. Sensor 104 may include a photodiode configured to convert light, heat, electromagnetic elements, and the like thereof, into electrical current for further analysis and/or manipulation. Sensor 104 may include circuitry or electronic components configured to digitize, transform, or otherwise manipulate electrical signals. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. The plurality of datum captured by sensor 104 may include circuitry, computing devices, electronic components or a combination thereof that translates into at least an electronic signal configured to be transmitted to another electronic component. Sensor 104 may be disposed on at least an actuator of the electric aircraft. An "actuator," for the purpose of this disclosure, is any flight component or any part of an electric aircraft that helps it to achieve physical movements by converting energy, often electrical, air, or hydraulic, into mechanical force and enable movement. "Disposed," for the purpose of this disclosure, is the physical placement of a computing device on an actuator. In a non-limiting embodiment, actuator may include a flight component. In a non-limiting embodiment, sensor 104 may include a plurality of individual sensors disposed on each actuator of the electric aircraft. In a non-limiting embodiment, sensor 104 may be mechanically and communicatively connected to one or more throttles. The throttle may be any throttle as described herein, and in non-limiting examples, may include pedals, sticks, levers, buttons, dials, touch screens, one or more computing devices, and the like. Additionally, a right-hand floor-mounted lift lever may be used to control the amount of thrust provided by the lift fans or other propulsors. The rotation of a thumb wheel pusher throttle may be mounted on the end of this lever and may control the amount of torque provided by the pusher motor, or one or more other propulsors, alone or in combination. Any throttle as described herein may be consistent with any throttle described in U.S. patent application Ser. No. 16/929,206 and titled, "Hover and Thrust Control Assembly for Dual-Mode Aircraft", which is incorporated herein in its entirety by reference. Sensor 104 may be mechanically and communicatively connected to an inceptor stick. The pilot input may include a left-hand strain-gauge style STICK for the control of roll, pitch and yaw in both forward and assisted lift flight. A 4-way hat switch on top of the left-hand stick enables the pilot to set roll and pitch trim. Inceptor stick may include any inceptor stick as described in the entirety of this disclosure. Persons skilled in the art, upon reviewing the entirety of this disclosure, will be aware various embodiments and functions of a pilot input and inceptor stick for purposes as described herein.

Still referring to FIG. 1, computing device 112 may include an aircraft control located within system 100. As used in this disclosure an "aircraft control" is a control and/or guidance system that maneuvers the aircraft. In an embodiment, the aircraft control may include a mechanical and/or manually operated flight control system. For example, and without limitation the aircraft control may include a collective control. As used in this disclosure a "collective control" is a mechanical control of an aircraft that allows a pilot and/or other operator to adjust and/or control the pitch angle of aircraft. For example and without limitation, collective control may alter and/or adjust a pitch angle of all the main rotor blades collectively. For example, and without limitation the aircraft control may include a yoke control. As used in this disclosure a "yoke control" is a mechanical control of an aircraft to control the pitch and/or roll. For example and without limitation, yoke control may alter and/or adjust the roll angle of aircraft as a function of controlling and/or maneuvering ailerons. In an embodiment, the aircraft control may include one or more foot brakes, control sticks, pedals, throttle levels, and the like thereof. Additionally or alternatively, the aircraft control may be configured to translate a desired command from aircraft datum 108. As used in this disclosure a "desired command" is a direction and/or command that a pilot desires, wishes, and/or wants for a flight component. In an embodiment, and without limitation, desired command may include a desired torque for a flight component. For example, and without limitation, the aircraft control may translate that a desired torque for a propeller be 160 lb. ft. of torque. As a further non-limiting example, the aircraft control may translate that a pilot's desired torque for a propulsor be 290 lb. ft. of torque. In another embodiment, the aircraft control may include a digital and/or automated flight control system. For example, and without limitation, the aircraft control may include a computing device and/or flight controller capable of producing an autonomous function. Persons skilled in the art, upon reviewing the entirety of this disclosure, will be aware of the various embodiments of an aircraft control for the purposes as described in the entirety of this disclosure.

Referring still to FIG. 1, sensor 104 may be mechanically and communicatively connected to a foot pedal. In a non-limiting embodiment, system 100 may incorporate wheeled landing gear steerable by differential braking accessed by floor mounted pedals; in the event of installing such a foot actuated "caveman" infrastructure, yaw control also may be affected through differential foot pressure. A stick may be calibrated at zero input (relaxed state) and at the stops in pitch and roll. The calibration may be done in both directions of roll and both directions of pitch. Any asymmetries may be handled by a bilinear calibration with the breakpoint at the neutral point. Likewise, a yaw zero point may correspond to a relaxed state of an inceptor stick. The full-scale torque in each twist direction may be independently calibrated to the maximum torque seen in the calibration process in that direction. In all phases of flight, the control surface deflections may be linearly mapped to their corresponding maximum stick deflections and neutral position. In the case of roll, where there may be more aileron deflection in the trailing edge up direction, the degrees of deflection per pilot input unit may be different in each direction, such that full surface deflection may be not reached until full stick deflection. When the lift fans are engaged, the pilot's stick inputs may correspond to roll and pitch attitude (+/−30 deg) and yaw rate (+/−60 deg/second) commands, which are also linearly mapped to the full range of stick travel. A breakout force of 2-3 Newtons (0.5 lbf minimums mil spec 1797 min breakout force) measured at center of stick grip position may be applied prior to the linear mapping. Breakout force prevents adverse roll yaw coupling. In order to remove the need for constant control input in steady forward flight, pitch and roll trim may be available. Pitch trim may be limited to +7 deg pitch up trim and −5 deg pitch down trim, which may be sufficient to trim for level flight over the entire center of gravity and cruise airspeed range in non-limiting examples. Roll trim limited to 2 degrees (average between the ailerons) may be also available. The trim may be applied after the breakout force to change the input that center stick corresponds to. This trimmed command applies to both the attitude commands when the lift rotors are powered, and the control surface deflections at all times. In order to ensure the pilot can always access the full capability of the aircraft, the mapping below from pre-trim input to post-trim input may be used when trim is nonzero. Note that with positive trim, the effective sensitivity in the positive direction has decreased while the sensitivity in the negative direction has increased. This is a necessary byproduct of enforcing the constraint that full stick deflection yields full control surface deflection. The lift lever has very low additional breakout torque and requires a constant (but adjustable) torque of 3.1 Nm during movement, which translates to 2 lbf at the intended grip position. Control of the lift motors may be only active when the assisted lift lever may be raised above 3.75 degrees from the full down stop (out of 25 degrees total). This may represent a debounce mechanism that may be determined based on the friction of the assisted lift lever, the mass and the expected cockpit vibration levels. A mechanical detent may be installed on the lift lever at an angle corresponding to 15% average torque in order to provide kinesthetic feedback to the pilot of the minimum lift lever setting which provides adequate control authority via the lift fans.

With continued reference to FIG. 1, sensor 104 may include a motion sensor. A "motion sensor", for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 104 may include, but not limited to, torque sensor, gyroscope, accelerometer, magnetometer, inertial measurement unit (IMU), pressure sensor, force sensor, proximity sensor, displacement sensor, vibration sensor, LIDAR sensor, and the like. In a non-limiting embodiment sensor 104 ranges may include a technique for the measuring of distances or slant range from an observer including sensor 104 to a target which may include a plurality of outside parameters. "Outside parameter," for the purposes of this disclosure, refer to environmental factors or physical electric vehicle factors including health status that may be further be captured by a sensor 104. Outside parameter may include, but not limited to air density, air speed, true airspeed, relative airspeed, temperature, humidity level, and weather conditions, among others. Outside parameter may include velocity and/or speed in a plurality of ranges and direction such as vertical speed, horizontal speed, changes in angle or rates of change in angles like pitch rate, roll rate, yaw rate, or a combination thereof, among others. Outside parameter may further include physical factors of the components of the electric aircraft itself including, but not limited to, remaining fuel or battery. Outside parameter may include at least an environmental parameter. Environmental parameter may be any environmentally based performance parameter as disclosed herein. Environment parameter may include, without limitation, time, pressure, temperature, air density, altitude, gravity, humidity level, airspeed, angle of attack, and debris, among others. Environmental parameters may be stored in any suitable datastore consistent with this disclosure. Environmental parameters may include latitude and longitude, as well as any other environmental condition that may affect the landing of an electric aircraft. Technique may include the use of active range finding methods which may include, but not limited to, light detection and ranging (LIDAR), radar, sonar, ultrasonic range finding, and the like. In a non-limiting embodiment, sensor 104 may include at least a LIDAR system to measure ranges including variable distances from sensor 104 to a potential landing zone or flight path. LIDAR systems may include, but not limited to, a laser, at least a phased array, at least a microelectromechanical machine, at least a scanner and/or optic, a photodetector, a specialized GPS receiver, and the like. In a non-limiting embodiment, sensor 104 including a LIDAR system may targe an object with a laser and measure the time for at least a reflected light to return to the LIDAR system. LIDAR may also be used to make digital 4-D representations of areas on the earth's surface and ocean bottom, due to differences in laser return times, and by varying laser wavelengths. In a non-limiting embodiment the LIDAR system may include a topographic LIDAR and a bathymetric LIDAR, wherein the topographic LIDAR that may use near-infrared laser to map a plot of a land or surface representing a potential landing zone or potential flight path while the bathymetric LIDAR may use water-penetrating green light to measure seafloor and various water level elevations within and/or surrounding the potential landing zone. In a non-limiting embodiment, electric aircraft may use at least a LIDAR system as a means of obstacle detection and avoidance to navigate safely through environments to reach a potential landing zone. Sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor.

With continued reference to FIG. 1, sensor 104 may further include a sensor suite. One or more sensors may be communicatively connected to at least a pilot control, the manipulation of which, may constitute at least an aircraft command. "Communicative connecting", for the purposes of this disclosure, refers to two or more components electrically, or otherwise connected and configured to transmit and receive signals from one another. Signals may include electrical, electromagnetic, visual, audio, radio waves, or another undisclosed signal type alone or in combination. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor 104 may include circuitry, computing devices, electronic components or a combination thereof that translates objective constraint 144 into at least an electronic signal configured to be transmitted to another electronic component. At least a sensor communicatively connected to at least a pilot control may include a sensor disposed on, near, around or within at least pilot control.

Further referring to FIG. 1, at least pilot control may be physically located in the cockpit of the aircraft or remotely located outside of the aircraft in another location communicatively connected to at least a portion of the aircraft. In an embodiment, communicative connecting includes electrically coupling an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. At least pilot control may be configured to receive pilot input. Pilot input may include a physical manipulation of a control like a pilot using a hand and arm to push or pull a lever, or a pilot using a finger to manipulate a switch. Pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, or be connected to sensor 104.

In an embodiment, and still referring to FIG. 1, sensor 104 may be attached to one or more pilot inputs and attached to one or more pilot inputs, one or more portions of an aircraft, and/or one or more structural components, which may include any portion of an aircraft as described in this disclosure. As used herein, a person of ordinary skill in the art would understand "attached" to mean that at least a portion of a device, component, or circuit is connected to at least a portion of the aircraft via a mechanical connection. Said mechanical connection can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling can be used to join two pieces of rotating electric aircraft components. Control surfaces may each include any portion of an aircraft that can be moved or adjusted to affect altitude, airspeed velocity, groundspeed velocity or direction during flight. For example, control surfaces may include a component used to affect the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, control surfaces may include a rudder, which may include, without limitation, a segmented rudder. The rudder may function, without limitation, to control yaw of an aircraft. Also, control surfaces may include other flight control surfaces such as propulsors, rotating flight controls, or any other structural features which can adjust the movement of the aircraft. A "control surface" as described herein, is any form of a mechanical linkage with a surface area that interacts with forces to move an aircraft. A control surface may include, as a non-limiting example, ailerons, flaps, leading edge flaps, rudders, elevators, spoilers, slats, blades, stabilizers, stabilators, airfoils, a combination thereof, or any other mechanical surface are used to control an aircraft in a fluid medium. Persons skilled in the art, upon reviewing the entirety of this disclosure, will be aware of various mechanical linkages that may be used as a control surface, as used and described in this disclosure.

Still referring to FIG. 1, sensor 104 may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. Sensor 104 may be part of a sensor suite wherein individual sensors may include separate sensors measuring physical or electrical quantities that may be powered by and/or in communication with circuits independently, where each may signal sensor output to a control circuit such as a user graphical interface. As a further example a degree of torque may be sensed, without limitation, using load sensors deployed at and/or around a propulsor and/or by measuring back electromotive force (back EMF) generated by a motor driving the propulsor. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. One of ordinary skill in the art will appreciate, after reviewing the entirety of this disclosure, that motion may include a plurality of types including but not limited to: spinning, rotating, oscillating, gyrating, jumping, sliding, reciprocating, or the like. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. At least a sensor may be configured to detect pilot input from at least pilot control. At least pilot control may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety.

With continued reference to FIG. 1, sensor 104 may be configured to detect aircraft datum 108. An "aircraft datum," for the purpose of this disclosure, is any element of data describing parameters captured by sensor 104 such as the outside environment and physical values describing the performance or qualities of flight components of the electric aircraft. In a non-limiting embodiment, sensor 104 may be disposed on the electric aircraft. For example and without limitation, sensor 104 may include a plurality of individual sensors located on each major flight component of the electric aircraft such as, but not limited to, a battery pack, a motor, a propulsor, and the like thereof. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Sensor 104 may include circuitry, computing devices, electronic components or a combination thereof that translates a plurality of datum into at least an electronic signal configured to be transmitted to another electronic component. In a non-limiting embodiment, aircraft datum 108 may include any datum describing the components that factor into the operation of a vehicle. In a non-limiting embodiment, aircraft datum 108 may include a plurality of histories, records, projections, and the like thereof, regarding the operation of the vehicle. In a non-limiting embodiment, aircraft datum 108 may include a plurality of records, reports, logs, and the like thereof, describing the performance history of the vehicle. In a non-limiting embodiment, aircraft datum 108 may include information describing, but not limited to, vehicle personnel, vehicle capabilities, and the like thereof. In a non-limiting embodiment, aircraft datum 108 may include information describing the maintenance, repair, and overhaul of a vehicle or a vehicle's components. In a non-limiting embodiment, aircraft datum 108 may include a record of maintenance activities and their results including a plurality of tests, measurements, replacements, adjustments, repairs, and the like, that may be intended to retain and/or restore a functional unit of a vehicle. Aircraft datum 108 may include a record of data of, but not limited to, functional checks, servicing, repairing or replacing of necessary devices, equipment, machinery, and the like, pertaining to the vehicle. In a non-limiting embodiment, aircraft datum 108 may include a unique identification number denoting a part of a vehicle that was installed, repaired, or replaced as a function of a maintenance. In a non-limiting embodiment, aircraft datum 108 may include a record of maintenance and/or repair schedules corresponding to a vehicle. The plurality of measured aircraft operation datum may include a record of potential maintenance and repair schedules corresponding to a vehicle. A "maintenance schedule," for the purposes of this disclosure, refer to an appointment reserved for an aircraft for a maintenance or repair to be conducted upon. Aircraft datum 108 may include any confidential information and/or data describing a vehicle and its operation. For example and without limitation, aircraft datum 108 may include information classified by different level of confidentiality for specific users with different level of authority and/or access to confidential information. For example and without limitation, aircraft datum 108 may include detailed information about the history and or background of a pilot of a vehicle which may be classified with a high classification label in which a user with a high classification label may access such information. For example and without limitation, information about flight destination, arrival, flight time, and the like thereof may be assigned a low classification label which may be available to any user with a low classification label and above. Persons skilled in the art, upon reviewing the entirety of this disclosure, will be aware of the various levels of information describing an electric aircraft as disclosed in the entirety of this disclosure.

With continued reference to FIG. 1, aircraft datum 108 may include a flight component state data. A "flight component state data," for the purposes of this disclosure, refer to any datum that represents the status or health status of a flight component or any component of an electric aircraft. The flight component state data of a flight component of a plurality of flight components. A "flight component", for the purposes of this disclosure, includes components related to, and mechanically connected to an aircraft that manipulates a fluid medium in order to propel and maneuver the aircraft through the fluid medium. In a non-limiting embodiment, the operation of the aircraft through the fluid medium will be discussed at greater length hereinbelow. In a non-limiting embodiment, the flight component state data may include a plurality of state information of a plurality of flight components of the electric aircraft. For example and without limitation, a flight component may include, propellers, vertical propulsors, forward pushers, landing gears, rudders, motors, rotors, and the like thereof. A state information of the plurality of state information of the plurality of aircraft components may include an aircraft flight duration, a distance of the aircraft flight, a plurality of distances of an aircraft from the surface, and the like. The flight component state data may denote a location of the aircraft, status of the aircraft such as health and/or functionality, aircraft flight time, aircraft on frame time, and the like thereof. In a non-limiting embodiment, the flight component state data may include aircraft logistics of an electric aircraft of a plurality of electrical aircraft.

With continued reference to FIG. 1, computing device 112 may be configured to receive objective constraint 144. In a non-limiting embodiment, objective constraint 144 may be detected by sensor 104. For example and without limitation, aircraft datum 108 may include objective constraint 144. An "objective constraint," for the purpose of this disclosure, is any datum or element of data identifying and/or a pilot input or command. In a non-limiting embodiment, objective constraint 144 may include any factor regarding the electric aircraft and its flight that could be changed, relative to its current position and operating status. For example and without limitation, objective constraint 144 may include a requirement that the electric aircraft must deplete all of its energy source of tis battery pack, wherein the remaining battery source may be at full capacity or at half capacity. Objective constraint 144 may include a requirement that the electric aircraft must follow a specific aircraft configuration, such as, but not limited to, fixed wing flight and/or vertical wing flight. In a non-limiting embodiment, objective constraint 144 must be a limiting requirement realistically feasible given the current status of the electric aircraft. For example and without limitation, objective constraint 144 may not include a constraint that the electric aircraft must achieve a flight duration of three hours, for a given electric aircraft wherein such requirements may not be feasible or realistically achievable given the type of electric aircraft, location of the electric aircraft's destination, air traffic, weather, and the like thereof. In a non-limiting embodiment, objective constraint 144 may include any achievable modifications of the electric aircraft. For example and without limitation, objective constraint 144 may include using an electric aircraft with a specific amount of battery pack units. In another non-limiting example, objective constraint 144 may include a specific velocity to maintain and/or specific maximum velocity limit for the electric aircraft to maintain. In a non-limiting embodiment, objective constraint 144 may be inputted by a user via user device 140. For example and without limitation, the user may include a pilot of the electric aircraft and may concurrently interact with user device 140 to input objective constraint 144 in order to generate aircraft recommendation 152 during an operation and/or a flight. In another non-limiting example, objective constraint 144 may be inputted by any user, wherein the user may be located remotely relative to the electric aircraft. In a non-limiting embodiment, objective constraint 144 may be used to constrain users unfamiliar with the logistics and capabilities of the electric aircraft from inputting unrealistic and infeasible constraints for the electric aircraft in the generation of aircraft recommendation 152. Persons skilled in the art, upon reviewing the entirety of this disclosure, will be aware of the various embodiments of constraints in generating any recommendation for an electric aircraft and its flight for purpose as described herein.

With continued reference to FIG. 1, in a non-limiting embodiment, objective constraint 144 may include a factor that includes a manipulation of one or more pilot input controls as described above that correspond to a desire to affect an aircraft's trajectory as a function of the movement of one or more flight components and one or more propulsors, alone or in combination. The operation of the aircraft through the fluid medium will be discussed at greater length hereinbelow. In a non-limiting embodiment, objective constraint 144 may include information gathered by one or more sensors. At least a pilot control may be communicatively connected to any other component presented in system, the communicative connection may include redundant connections configured to safeguard against single-point failure. Pilot input may indicate a pilot's desire to change the heading or trim of an electric aircraft. Pilot input may indicate a pilot's desire to change an aircraft's pitch, roll, yaw, or throttle. Aircraft trajectory is manipulated by one or more control surfaces and propulsors working alone or in tandem consistent with the entirety of this disclosure, hereinbelow. Pitch, roll, and yaw may be used to describe an aircraft's attitude and/or heading, as they correspond to three separate and distinct axes about which the aircraft may rotate with an applied moment, torque, and/or other force applied to at least a portion of an aircraft. "Pitch", for the purposes of this disclosure refers to an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. When angle of attack is not an acceptable input to any system disclosed herein, proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, like in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. Pilot input, when referring to throttle, may refer to a pilot's desire to increase or decrease thrust produced by at least a propulsor. In a non-limiting embodiment, objective constraint 144 may include an input datum. An "input datum," for the purpose of this disclosure, is for the purpose of this disclosure, is any datum or element of data identifying and/or a pilot input or command. In a non-limiting embodiment, the input datum may include a manipulation of one or more pilot input controls as described above that correspond to a desire to affect an aircraft's trajectory as a function of the movement of one or more flight components and one or more propulsors, alone or in combination. In a non-limiting embodiment, the input datum may include an electrical signal. In a non-limiting embodiment, input datum may include mechanical movement of any throttle consistent with the entirety of this disclosure. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least sensor 104 may include circuitry, computing devices, electronic components or a combination thereof that translates pilot input into input datum 108 configured to be transmitted to any other electronic component.

With continued reference to FIG. 1, objective constraint 144 may include an input from a user from a remote location. In a non-limiting embodiment, a user may interact with user device 140 to receive objective constraint 144 which may be then transmitted to computing device 112 for further analysis. A "user device," for the purpose of this disclosure, is any additional computing device, such as a mobile device, laptop, desktop computer, or the like. In a non-limiting embodiment, user device 140 may be a computer and/or smart phone operated by a user in a remote location. User device 140 may include, without limitation, a display in communication with computing device 104; the display may include any display as described in the entirety of this disclosure such as a light emitting diode (LED) screen, liquid crystal display (LCD), organic LED, cathode ray tube (CRT), touch screen, or any combination thereof. In a non-limiting embodiment, user device 140 may include a graphical user interface configured to display any information from computing device 112 and/or any computing device. For example and without limitation, user device 140 may be mechanically coupled to a cockpit of the electric aircraft which may be used by a pilot of the electric aircraft. Persons skilled in the art, upon reviewing the entirety of this disclosure, will be aware of the various embodiments of an interactive device that may be used by any user for purposes as described herein.

Still referring to FIG. 1, a user operating user device 140 may interact with user device 140 by entering inputs denoting various preferences. The various preferences may be represented as objective constraint 144, in which aircraft recommendation 152 may be generated, at least in part, by the user via user device 140. In a non-limiting embodiment, the pilot operating the electric aircraft may receive objective constraint 144 inputted by the user. In another non-limiting embodiment, the pilot may receive objective constraint 144 in tandem with the user operating user device 140. In some embodiment, the pilot may review objective constraint 144 and manually enter the pilot's own inputs based on the pilot's best judgment, wherein the pilot has the final authority over the inputs for generating aircraft recommendation 152. For example and without limitation, the user may input a preference that the electric aircraft must fly at a specific altitude, but the pilot may realize that the flight path towards the destination may include obstacles that may interfere with the path of the electric aircraft, in which the pilot may adjust, alter, remove, etc., the objective constraint entered by the user to generate aircraft recommendation 52. Persons skilled in the art, upon reviewing the entirety of this disclosure, will be aware of generating a plan based on one or more users, wherein one user has the final decision.

With continued reference to FIG. 1, sensor 104 may be configured to capture data of a battery pack of the electric aircraft. In a non-limiting embodiment, aircraft datum 108 may include, at least in part, battery pack data. For example and without limitation, aircraft datum 108 may include data such as temperature of the battery pack of the electric aircraft. For example and without limitation, sensor 104 may detect the rate of consumption and/or usage of the battery pack. In a non-limiting embodiment, sensor 104 may detect a plurality of cooling parameters and/or heating parameters of the battery pack. For example and without limitation, the cooling parameter may include a depreciating rate of temperature of the battery pack. For example and without limitation, the heating parameter may include an increasing rate of temperature of the battery pack in the event of power consumption. In a non-limiting embodiment, aircraft datum 108 may include information such as specific battery pack version, maximum battery capacity, remaining battery capacity, charge cycle of battery pack, current lifespan of battery pack, and the like thereof. Persons skilled in the art, upon reviewing the entirety of this disclosure, will be aware of the various information surrounding the battery pack and the usage of the battery pack for purposes as described herein.

With continued reference to FIG. 1, computing device 112 may be configured to receive flight plan 132. A "flight plan," for the purpose of this disclosure, is an element or signal of data that represents an electric aircraft path from an arrival location to a destination location. In a non-limiting embodiment, flight plan 132 may include various environmental or outside parameters. Flight plan 132 may include an element of that representing the safest, most efficient, shortest, or a combination thereof, flight path. In a non-limiting embodiment, flight path towards a closest recharging pad may be generated and/or recommended when computing device 112 detects the electric aircraft is low on power. In a non-limiting embodiment, flight plan 132 may originate from central authority 128. A "central authority," for the purpose of this disclosure, is an air traffic control authority that serves to communicate with the electric aircraft and direct the aircraft on the ground and through controlled airspace.

In a non-limiting embodiment, flight plan 132 may be any flight plan that may be selected by a user and/or pilot of the electric aircraft that may be authorized by central authority 128. For example and without limitation, the pilot may verify with central authority 128 if proposed flight plan 132 is valid in which central authority 128 may respond with a decision. In a non-limiting embodiment, central authority 128 may communicate with the electric aircraft, pilot and/or user, and/or computing device 112 via automated broadcaster 136. An "automated broadcaster," for the purposes of this disclosure, is a surveillance technology used to communicate aircraft position information to separate entity such as central authority 128 or another aircraft in flight. Automated broadcaster 136 may include an inter-pilot air-to-air communication channel. Automated broadcaster 136 may include a datalink system configured to communicate data between a ground station and the electric aircraft. Automated broadcaster 136 may include a satellite communication (SATCOM) receiver configured to transmit signals via a satellite. Automated broadcaster 136 may include an automatic dependent surveillance broadcast. In a non-limiting embodiment, computing device 112 may operate an air traffic communication channel. An "air traffic communication channel," for the purposes of this disclosure, is a physical transmission medium for telecommunications and/or computer networking. The air traffic communication channel may be configured to convey signals between the electric aircraft and central authority 128. The air traffic communication channel may be configured to convey signals between the electric aircraft and other aircrafts in the air. In a non-limiting embodiment, the air traffic communication channel may include a very high frequency (VHF) communication channel. In a non-limiting embodiment, the air traffic communication channel may include and/or operate automated broadcaster 132.

With continued reference to FIG. 1, computing device 112 may be configured to operate flight simulator 116. As used in this disclosure, a "flight simulator" is a program or set of operations that simulate flight. For instance and without limitation, flight simulator 116 may be consistent with flight simulator in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT" which is incorporated herein in its entirety. In some cases, flight simulator 116 may simulate flight within an environment, for example an environmental atmosphere in which aircraft fly, airports at which aircraft take-off and land, and/or mountains and other hazards aircraft attempt to avoid crashing into. In some cases, an environment may include geographical, atmospheric, and/or biological features. In some cases, flight simulator 116 may model an artificial and/or virtual aircraft in flight as well as an environment in which the artificial and/or virtual aircraft flies. In some cases, a flight simulator 116 may include one or more physics models, which represent analytically or through data-based, such as without limitation machine-learning processes, physical phenomenon. Physical phenomenon may be associated with an aircraft and/or an environment. For example, some versions of flight simulator 116 may include thermal models representing aircraft components by way of thermal modeling. Thermal modeling techniques may, in some cases, include analytical representation of one or more of convective hear transfer (for example by way of Newton's Law of Cooling), conductive heat transfer (for example by way of Fourier conduction), radiative heat transfer, and/or advective heat transfer. In some cases, flight simulator 116 may include models representing fluid dynamics. For example, in some embodiments, flight simulator may include a representation of turbulence, wind shear, air density, cloud, precipitation, and the like. In some embodiments, flight simulator 116 may include at least a model representing optical phenomenon. For example, flight simulator may include optical models representative of transmission, reflectance, occlusion, absorption, attenuation, and scatter. Flight simulator 116 may include non-analytical modeling methods; for example, the flight simulator may include, without limitation, a Monte Carlo model for simulating optical scatter within a turbid medium, for example clouds.

With continued reference to FIG. 1, computing device 112 may be configured to generate flight phase model 120 as a function of aircraft datum 108 and flight plan 132. A "flight phase model," for the purpose of this disclosure, is a simulation and/or model of an electric aircraft that embodies an analytical and/or interactive visualization regarding at least a flight phase of aircraft operations and/or performance capabilities of the electric aircraft. At least a "flight phase," for the purpose of this disclosure, is an action or a plurality of actions to be performed by an aircraft to complete a flight or complete flight plan 132. In a non-limiting embodiment, flight phase model 120 may include a model that may be altered to satisfy tuning parameter 148 and/or objective constraint 144 in the generating of aircraft recommendation 152. For example and without limitation, flight phase model 120 may include a model depicting the power consumption for an entire flight or for one portion of a flight, a flight maneuver such as, but not limited to, a landing, a takeoff, a turn, an attitude shift, a change in angle of attack, and the like thereof. In another non-limiting example, flight phase model 120 may include a model depicting the electric aircraft making one or more stops at a charging station, a number of hours to be spent flying given a specific time requirement as a function of objective constraint 144, etc. In a non-limiting embodiment, flight phase model 120 may depict any flight that could be affected by any parameters described herein, such as objective constraint 144 and/or tunable parameter 148. In a non-limiting embodiment, the at least a flight phase may include any maneuver of the electric aircraft made to complete a flight. Persons skilled in the art, upon reviewing the entirety of this disclosure, will be aware of the various embodiments of simulating a model based on various flight requirements and parameters for purposes as described herein.

With continued reference to FIG. 1, computing device 112 may operate flight simulator 116 to simulate flight phase model 120. In a non-limiting embodiment, flight phase model 120 may include, at least in part, a virtual representation. As described in this disclosure, a "virtual representation" includes any model or simulation accessible by computing device which is representative of a physical phenomenon, for example without limitation at least a part of an electric vehicle such as an electric vehicle and/or its battery pack, or a simulator module. For instance and without limitation, the virtual representation may be consistent with virtual representation in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT" which is incorporated herein in its entirety. In some cases, virtual representation may be interactive with flight simulator 116. Flight simulator 116 may include a flight simulator. For instance and without limitation, flight simulator 116 may be consistent with flight simulator in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT" which is incorporated herein in its entirety. For example, in some cases, data may originate from flight phase model 120 and be input into flight simulator 116. Alternatively or additionally, in some cases, flight phase model 120 may modify or transform data already available to flight simulator 116. In some cases, flight phase model 120 may include a virtual controller area network. In further non-limiting illustrative examples, the virtual controller area network may be consistent with virtual controller area network in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT" which is incorporated herein in its entirety. In a non-limiting embodiment, flight simulator may consider all receiving inputs including, but not limited to, flight plan 132, input datum, and aircraft datum 108 in order to simulate a virtual representation of aircraft recommendation 152. In a non-limiting embodiment, aircraft recommendation 152 may include, at least in part, flight phase model 120.

With continued reference to FIG. 1, computing device 112 may be configured to communicatively connect to a network. In a non-limiting embodiment, user device 140 may be connected to computing device 112 via the network. In a non-limiting embodiment, computing device 112 and user device 140 may be isolated from each other. The network may include a mesh network. The mesh network may include an avionic mesh network. The mesh network may include, without limitation, an avionic mesh network. For instance and without limitation, the avionic mesh network may be consistent with the avionic mesh network in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT," which is incorporated herein by reference in its entirety. In some embodiments, the network may include an intra-aircraft network and/or an inter-aircraft network. Intra-aircraft network may include any intra-aircraft network described in this disclosure. Inter-aircraft network may include any inter-aircraft network described in this disclosure.

With continued reference to FIG. 1, an "aircraft recommendation," is any model, simulation, and/or configuration of information describing a plurality of potential changes that may be made and result in. In a non-limiting embodiment, aircraft recommendation 152 may be affected by objective constraint 144 that may be entered by a user via user device 140. For example and without limitation, computing device 112 may independently generate aircraft recommendation 152 based on current measured data but also have the functionality to incorporate objective constraint 144, which may include, but not limited to, user preferences, user complaints, additional performance factors, and the like thereof, and generate a new aircraft recommendation based on the new information. Persons skilled in the art, upon reviewing the entirety of this disclosure, will be aware of the various inputs and unique user inputs for the generation of a recommendation for purposes as described herein.

With continued reference to FIG. 1, computing device 116 may be configured to identify tunable parameter 148 of at the at least a flight phase as a function of objective constraint 144. A "tunable parameter," for the purposes of this disclosure, is a dependent factor denoting an action that an aircraft can perform to achieve an improved result. In a non-limiting embodiment, tunable parameter 148 may include a plurality of information which may uniquely identify the electric aircraft for the purposes of denoting an authorized flight plan for the electric aircraft. In a non-limiting embodiment, tunable parameter 148 may be the same as objective constraint 144. Tunable parameter 148 may include any specific input from the user via user device 140. For example and without limitation, a use may submit a requirement of a specific type of battery pack to be used and/or considered in the generation of aircraft recommendation 152. The user may submit a requirement for aircraft recommendation 152 for an electric aircraft with more or less battery packs. In a non-limiting embodiment, the user may submit specific destination location, attitude parameters, turbulence preferences, and the like thereof. For example and without limitation, the user may submit a requirement that the electric aircraft incorporate fixed wing landing, vertical landing, etc. Tunable parameter 148 may include an aircraft class, an operator requirement, and an aircraft limit. An "aircraft class," for the purposes of this disclosure, is an identification denoting a category of aircraft the electric aircraft falls within. In a non-limiting embodiment, aircraft class may include one or more classes such as drones, passenger aircrafts, STOL aircrafts, delivery drones, VTOL aircrafts, eVTOL aircrafts, commercial airliners, cargo aircrafts, and the like thereof. Aircraft class may include, but not limited to, a unique identification number denoting type of aircraft. an "operator requirement," for the purposes of this disclosure, is an identification of the type of personnel/operator of the aircraft. the personnel/operator may include a pilot, an autopilot, and/or semi-autonomous pilot, wherein the operator requirement may include one or more of the mentioned personnel/operator. In a non-limiting embodiment, the operator requirement may denote a pilot wherein the tunable parameter including the operator requirement may be transmitted to an air ATC authority so that the ATC authority may be informed that it is communicating with a physical pilot. An "aircraft limit," for the purposes of this disclosure, is an element of data representing the maximum capacity and/or capabilities of the electric aircraft. aircraft limit may include parameters of an aircraft's altitude limit, flight range, flight time limit, cargo capacity, and the like thereof. In a non-limiting embodiment, aircraft limit may include an altitude limit of a drone to be 400 feet above the surface wherein the altitude limit of an eVTOL aircraft may be 1,500 feet above the surface. Computing device 116 may be configured to identify the tunable parameter 148 as a function of an tunable parameter database 140 which may store/receive the aircraft class, the operator requirement, and the aircraft limit. In a non-limiting embodiment, the computing device 116 may retrieve data from the tunable parameter database 140 to efficiently identify the tunable parameter 148 and its specific components such as aircraft class, operator requirement, and aircraft limit, without the use of a remote device 104. A person of ordinary skill in the art, after viewing the entirety of this disclosure, would appreciate the use of the tunable parameter database in identifying aircraft information.

With continued reference to FIG. 1, in a non-limiting embodiment, tunable parameter 148 may include any parameter that may be changed onto electric aircraft and its flight which may produce a realistic and/or feasible flight. For example and without limitation, tunable parameter 148 may include a flight wherein the electric aircraft is required to maximize its energy consumption before landing at a destination location. Computing device 112 may generate aircraft recommendation 152 wherein aircraft recommendation 152 may include a flight of the electric aircraft following flight plan 132 with only three stops at three charging stations, which is the minimum amount of stops the electric aircraft may make safely with minimal stops for recharging, wherein the original flight, depicted and generated as a function of flight phase model 120, may include a flight consisting of five stops at five charging stations. In another non-limiting example, tunable parameter 148 may include a requirement that the electric aircraft must not fall below a 30% capacity of its battery pack, in which computing device 112 may generate aircraft recommendation 152 as a function of simulating a new flight phase model using flight simulator 116 wherein the new aircraft recommendation may include a model depicting a flight of more frequent stops at charging stations. In a non-limiting embodiment, tunable parameter 148 may include any modifications suggested and/or preferred by a user. For example and without limitation, such modifications may not necessarily be improvements to optimize the flight of the electric aircraft, but rather a flight that prioritizes a specific user requirement such as objective constraint 144. Persons skilled in the art, upon reviewing the entirety of this disclosure, will be aware of the various embodiments of recommendations and simulations generated with outside considerations for purposes as described herein.

With continued reference to FIG. 1, generating aircraft recommendation 152 may include tuning tunable parameter 148 as a function of flight phase model 120 and objective constraint 144. In a non-limiting embodiment, tuning may include determining whether objective constraint 144 meets the requirements and rules established by central authority 128. In a non-limiting embodiment, tuning may include any communication with central authority 128 regarding any modifications and/or improvements for flight plan 132. For example and without limitation, objective constraint 144 may include a requirement that the electric aircraft must not stop for recharging unless the battery pack is at 30% capacity. However, a flight plan with such a requirement may not exist, therefore computing device 112 may tune tunable parameter 148 as a function of objective constraint 144 to include a requirement of the electric aircraft recharging when the battery pack falls to 40% instead, which a flight plan for such a requirement exists. Persons skilled in the art, upon reviewing the entirety of this disclosure, will be aware of the various embodiments of adjusting a constraint for the purposes of generating a recommendation for a flight for purposes as described herein.

With continued reference to FIG. 1, computing device 112 may be configured to operate flight monitoring module 124. A "flight monitoring module," for the purpose of this disclosure, is any suitable hardware and/or software device configured to monitor flight of the electric aircraft. In a non-limiting embodiment, flight monitoring module 124 may detect a status datum as a function of a sensor. In a non-limiting embodiment, flight monitoring module 124 may include sensor 104. In a non-limiting embodiment, aircraft datum 108 may include the status datum. In a non-limiting embodiment, flight monitoring module 124 may be configured to display the status datum to user device 140 in tandem with computing device 112 and display to the status datum of each controlling component of the electric aircraft. The "controlling component" of the electric aircraft, as described in the entirety of this disclosure, is a structural component and/or control surface of the electric aircraft. A structural component is any component of the aircraft that utilizes power, such as the battery pack and/or battery modules, propulsor, rotor, and the like. The control surface is any component of the aircraft, wherein movement of the component enables a pilot to control the flight altitude of the aircraft, such as ailerons, elevator, rudder, spoilers, flaps, slats, air brakes, tabs, winglet, vortex generators, chordwise barriers, and the like.

With continued reference to FIG. 1, computing device 112 may be configured to store any datum into a data storage system including flight plan historical database 156. A "flight plan historical database," for the purpose of this disclosure, is any database configured to store any datum that may be detected, received, measured, or generated by computing device 112. In a non-limiting embodiment, computing device 112 may retrieve a recommendation training set from flight plan historical database 156. A "recommendation training set," for the purpose of this disclosure, is any training set that correlate a previous stored data such as a previously stored aircraft datum and flight plan to an associated aircraft recommendation that was previously generated and stored in flight plan historical database 156. In a non-limiting embodiment, computing device 112 may be configured to train a machine-learning model, wherein the machine-learning model is configured to receive aircraft datum 108, flight phase model 120, and/or flight plan 132 as inputs and output an aircraft recommendation model as a function of a training data retrieved from flight plan historical database 156. An "aircraft recommendation model," for the purpose of this disclosure, is a model depicting aircraft recommendation 152 in a visual format. In a non-limiting embodiment, the aircraft recommendation model may include any virtual representation or simulation of flight phase model 120 associated with aircraft recommendation 152. The machine-learning model may generate an aircraft recommendation simulation that is a visual representation of aircraft recommendation 152. For example and without limitation, the aircraft recommendation simulation may illustrate the flight plan, flight path, and performance metrics of aircraft recommendation 152 which may also include tunable parameter 148. In a non-limiting embodiment, computing device may train the machine-learning model to output tunable parameter 148 given objective constraint 144 as an input. For example and without limitation, the machine-learning model may use a training data correlating a past objective constraint to a past tunable parameter from flight plan historical database 156 and output tunable parameter 148 that best associates the tunable parameter for the objective constraint 144. Persons skilled in the art, upon reviewing the entirety of this disclosure, will be aware of the various embodiments of the use of machine-learning for purposes as described herein.

With continued reference to FIG. 1, in a non-limiting embodiment, computing device 112 may include the outer loop controller, wherein the outer loop controller is configured to generate a rate setpoint as a function of aircraft datum 108. An "outer loop controller," for the purpose of this disclosure, is a computing device configured to input one or more parameters, such as aircraft datum and output the rate setpoint. For instance and without limitation, the outer loop controller may be consistent with outer loop controller in U.S. patent application Ser. No. 17/218,428 and titled "METHODS AND SYSTEMS FOR FLIGHT CONTROL CONFIGURED FOR USE IN AN ELECTRIC AIRCRAFT," which is incorporated herein by reference in its entirety. The outer loop controller may include one or more computing devices consistent with this disclosure and/or one or more components and/or modules thereof. The outer loop controller may be implemented using a microcontroller, a hardware circuit such as an FPGA, system on a chip, and/or application specific integrated circuit (ASIC). The outer loop controller may be implemented using one or more analog elements such as operational amplifier circuits, including operational amplifier integrators and/or differentiators. The outer loop controller may be implemented using any combination of the herein described elements or any other combination of elements suitable therefor. For instance and without limitation, the rate setpoint may be consistent with rate setpoint in U.S. patent application Ser. No. 17/218,428 and titled "METHODS AND SYSTEMS FOR FLIGHT CONTROL CONFIGURED FOR USE IN AN ELECTRIC AIRCRAFT," which is incorporated herein by reference in its entirety. Computing device 112 may use an outer angle loop driving an inner rate loop to provide closed loop control with setpoints of desired pitch attitude, roll attitude, and yaw rate provided directly by the pilot. The outer (angle) loop provides a rate setpoint. The rate setpoint may include the desired rate of change of one or more angles describing the aircraft's orientation, heading, and propulsion, or a combination thereof. The rate setpoint may include the pilot's desired rate of change of aircraft pitch angle, consistent with pitch angles, and largely at least an aircraft angle in the entirety of this disclosure. The rate setpoint may include a measurement in a plurality of measurement systems including quaternions or any other measurement system as described herein.

With continued reference to FIG. 1, computing device 112 may include an inner loop controller, wherein the inner loop controller may be configured to determine a moment datum as a function of the rate setpoint. An "inner loop controller," for the purpose of this disclosure, is a computing device configured to determine a moment of an aircraft using the rate setpoint from the outer loop controller. A "moment datum," for the purpose of this disclosure, is any information describing the moment of an aircraft. The moment datum includes information regarding pilot's desire to apply a certain moment or collection of moments on one or more portions of an electric aircraft, including the entirety of the aircraft. For instance and without limitation, inner loop controller may be consistent with inner loop controller in U.S. patent application Ser. No. 17/218,428 and titled "METHODS AND SYSTEMS FOR FLIGHT CONTROL CONFIGURED FOR USE IN AN ELECTRIC AIRCRAFT," which is incorporated herein by reference in its entirety. The inner loop controller may be implemented in any manner suitable for implementation of outer loop controller. The inner loop of the controller may be composed of a lead-lag filter for roll rate, pitch rate, and yaw rate, and an integrator that acts only on yaw rate. Integrators may be avoided on the roll and pitch rate because they introduce additional phase lag that, coupled with the phase lag inherent to slow lift fans or another type of one or more propulsors, limits performance. Furthermore, it may not be necessary to have good steady state error in roll and pitch rate, which an integrator helps achieve in yaw rate. A final component of the inner loop may include gain scheduling on lift lever input. As previously discussed, the only controller change between low speed flight and fully wing-borne flight may be this gain scheduling. The plot below shows the input to output gain of this function for varying lift lever inputs. At anything above the assisted lift input corresponding to zero airspeed flight, the full requested moment from the inner loop may be sent to the mixer. At assisted lift levels lower than this, the requested moment from the inner loop may be multiplied by a gain that linearly decays to zero as shown in the plot below. The exact shape of this gain reduction may be open to change slightly. Experimentation in simulation has shown that anything between a square root function up to the IGE average torque setting and the linear map shown above works acceptably. Because the moment that can be generated by the control surfaces in pitch may be such a strong function of angle of attack, the relatively small difference in hover moment achieved between the linear and square root maps may be washed out by the angle of attack variation in a transition. At low lift lever input, the plane would have to have significant unpowered lift (and therefore airspeed) to not lose altitude. In this case, the control surface effectivity will be significant, and full moment production from the lift motors will not be necessary. When the lift lever may be all the way down, the lift motors may stop rotation and stow into a low drag orientation. Then, the only control authority comes from the aerodynamic control surfaces, and the plane controlled exclusively via manual pilot inputs. On transition out from vertical to cruise flight, the coordination and scheduling of control may be intuitive and straightforward. In a non-limiting example, during the transition in, or decelerating from an aborted takeoff, it may be important that the pilot not decrease assisted lift below a 15% average torque threshold in order to maintain aircraft control and not develop an unrecoverable sink rate when operating in certain airspeed regimes such as the transition regime. A mechanical detent may be installed in the lift lever, throttle, or any control input, to provide proprioceptive feedback when crossing this threshold which should occur operationally only during the terminal phases of a vertical landing. In a non-limiting embodiment, the inner loop controller may include a lead-lag-filter. The inner loop controller may include an integrator. The attitude controller gains are scheduled such that full gain authority may be only achieved when the assisted lift lever may be greater than 50% torque, which corresponds to a nominal torque required to support the aircraft without fully developed lift from the wing. At average torque levels lower than said nominal levitation torque, the output of the inner loop (desired moment vector to apply to the vehicle) may be directly scaled down. This decrease in moment generated at the lift rotors may be designed to be directly complementary to the increase in aerodynamic control surface effectivity as the dynamic pressure builds on the flying wing and the flying surfaces. As a result, the total moment applied to the vehicle for a given pilot input may be kept near constant.

With continued reference to FIG. 1, computing device 112 may include a mixer, wherein the mixer may be configured to generate a torque allocation as a function of the moment datum. A "torque allocation," for the purpose of this disclosure, is an action of varying torque of an aircraft's flight components with optimization considerations. For instance and without limitation, torque allocation may be consistent with the description of torque allocation in U.S. patent application Ser. No. 17/197,427 filed on Mar. 10, 2021 and titled, "SYSTEM AND METHOD FOR FLIGHT CONTROL IN ELECTRIC AIRCRAFT", which is incorporated herein in its entirety by reference. A "mixer," for the purpose of this disclosure, is a computing device configured identify how much moment was generated by aerodynamic forces acting on one or more flight components and may feed this back to the inner loop controller and the outer loop controller to prevent integral windup. In a non-limiting embodiment, the torque allocation may include a command for one or more actuators of the electric aircraft. In a non-limiting embodiment, the torque allocation may include unique torque allocations for each actuator. For example and without limitation, the torque allocation may instruct each functioning actuator to allocate a torque output of 4 Nm and instruct defunct actuator to allocate a torque output of 0.4 Nm. For example and without limitation, the torque allocation may instruct one or more defunct actuators to command a torque of 0 Nm and the remaining functioning actuators a torque of 6 Nm. In a non-limiting embodiment, the torque allocation may be generated as a function of a torque allocation.

In a non-limiting embodiment, the moment datum may include a plurality of attitude commands and allocates one or more outgoing signals, such as modified attitude commands and output torque command, or the like, to at least a propulsor, flight component, or one or more computing devices connected thereto. For instance and without limitation, mixer may be consistent with mixer in U.S. patent application Ser. No. 17/218,428 and titled "METHODS AND SYSTEMS FOR FLIGHT CONTROL CONFIGURED FOR USE IN AN ELECTRIC AIRCRAFT," which is incorporated herein by reference in its entirety. Additionally and alternatively, a mixer, as used herein, may be described as performing "control allocation" or "torque allocation." For example, mixer may take in commands to alter aircraft trajectory that requires a change in pitch and yaw. Mixer may allocate torque to at least one propulsor (or more) that do not independently alter pitch and yaw in combination to accomplish the command to change pitch and yaw. More than one propulsor may be required to adjust torques to accomplish the command to change pitch and yaw, mixer would take in the command and allocate those torques to the appropriate propulsors consistent with the entirety of this disclosure. One of ordinary skill in the art, after reading the entirety of this disclosure, will appreciate the limitless combination of propulsors, flight components, control surfaces, or combinations thereof that could be used in tandem to generate some amount of authority in pitch, roll, yaw, and lift of an electric aircraft consistent with this disclosure.

With continued reference to FIG. 1, the mixer may be configured to receive at least the vehicle torque limit. The vehicle torque limit may include one or more elements of data representing maxima, minima, or other limits on vehicle torques, forces, attitudes, rates of change, or a combination thereof. The vehicle torque limit may include individual limits on one or more propulsors, one or more flight components, structural stress or strain, energy consumption limits, or a combination thereof. The vehicle torque limit may include attitudes in which aircraft cannot enter such as maximum or minimum pitch angle or pitch angle rate of change, the vehicle torque limit in a non-limiting example, may include a limit on one or more propulsors calculated in order to keep aircraft within a pitch angle range. The vehicle torque limit may be a relative limit, as in a non-limiting example, may include maximum lift from one or more propulsors based on environmental factors such as air density. The vehicle torque limits may include graphical limits, such as points or lines on a graphical representation of certain attitudes, such as pitch vs. lift, or pitch vs. roll, for example. The vehicle torque limits may be displayed to a pilot, user, or be embedded in the controls such that a pilot is unable to maneuver an aircraft that would violate the vehicle torque limit as described herein.

With continued reference to FIG. 1, the mixer may be configured to solve at least an optimization problem, which may be an objective function. An "objective function," as used in this disclosure, is a mathematical function with a solution set including a plurality of data elements to be compared. The mixer may compute a score, metric, ranking, or the like, associated with each performance prognoses and candidate transfer apparatus and select objectives to minimize and/or maximize the score/rank, depending on whether an optimal result may be represented, respectively, by a minimal and/or maximal score; an objective function may be used by mixer to score each possible pairing. At least an optimization problem may be based on one or more objectives, as described below. The mixer may pair a candidate transfer apparatus, with a given combination of performance prognoses, that optimizes the objective function. In various embodiments solving at least an optimization problem may be based on a combination of one or more factors. Each factor may be assigned a score based on predetermined variables. In some embodiments, the assigned scores may be weighted or unweighted. Solving at least an optimization problem may include performing a greedy algorithm process, where optimization may be performed by minimizing and/or maximizing an output of objective function. A "greedy algorithm" is defined as an algorithm that selects locally optimal choices, which may or may not generate a globally optimal solution. For instance, mixer may select objectives so that scores associated therewith are the best score for each goal. For instance, in non-limiting illustrative example, optimization may determine the pitch moment associated with an output of at least a propulsor based on an input.

Still referring to FIG. 1, at least an optimization problem may be formulated as a linear objective function, which mixer may optimize using a linear program such as without limitation a mixed-integer program. A "linear program," as used in this disclosure, is a program that optimizes a linear objective function, given at least a constraint; a linear program maybe referred to without limitation as a "linear optimization" process and/or algorithm. For instance, in non-limiting illustrative examples, a given constraint might be torque limit, and a linear program may use a linear objective function to calculate maximum output based on the limit. In various embodiments, mixer may determine a set of instructions towards achieving a user's goal that maximizes a total score subject to a constraint that there are other competing objectives. A mathematical solver may be implemented to solve for the set of instructions that maximizes scores; mathematical solver may be implemented on mixer and/or another device in flight control system 100, and/or may be implemented on third-party solver. At least an optimization problem may be formulated as nonlinear least squares optimization process. A "nonlinear least squares optimization process," for the purposes of this disclosure, is a form of least squares analysis used to fit a set of m observations with a model that is non-linear in n unknown parameters, where m is greater than or equal to n. The basis of the method is to approximate the model by a linear one and to refine the parameters by successive iterations. A nonlinear least squares optimization process may output a fit of signals to at least a propulsor. Solving at least an optimization problem may include minimizing a loss function, where a "loss function" is an expression an output of which a ranking process minimizes to generate an optimal result. As a non-limiting example, mixer may assign variables relating to a set of parameters, which may correspond to score components as described above, calculate an output of mathematical expression using the variables, and select an objective that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

With continued reference to FIG. 1, as previously disclosed, solving at least an optimization problem may include solving sequential problems relating to vehicle-level inputs to at least a propulsor, namely pitch, roll, yaw, and collective force. The mixer may solve at least an optimization problem in a specific order. According to exemplary embodiments, the mixer may solve at least an optimization problem wherein at least an optimization problem includes a pitch moment function. Solving may be performed using a nonlinear program and/or a linear program. Mixer may solve at least an optimization problem wherein solving at least an optimization program may include solving a roll moment function utilizing a nonlinear program to yield the desired amount of roll moment as a function of the desired amount of pitch moment. The mixer may solve at least an optimization problem wherein solving at least an optimization program may include solving a collective force function utilizing a nonlinear program to yield the desired amount of collective force as a function of the desired amount of pitch moment and the desired amount of roll moment. The mixer may solve at least an optimization problem wherein solving at least an optimization program may include solving a yaw moment function utilizing a nonlinear program to yield the desired amount of yaw moment, as a function of the desired amount of pitch moment, the desired amount of roll moment, and the desired amount of collective force. One of ordinary skill in the art, after reading the entirety of this disclosure, will appreciate that any force program may be implemented as a linear or non-linear program, as any linear program may be expressed as a nonlinear program.

With continued reference to FIG. 1, the mixer may include one or more computing devices as described herein. The mixer may be a separate component or grouping of components from those described herein. The mixer may be configured to allocate a portion of total possible torque amongst one or more propulsors based on relative priority of a plurality attitude control commands and desired aircraft maneuver. In a non-limiting illustrative example, torque allocation between two attitude control components (e.g., pitch and roll or roll and yaw) may be based on the relative priorities of those two attitude control components. Priority refers to how important to the safety of the aircraft and any users while performing the attitude control component may be relative to the other attitude control commands. Priority may also refer to the relative importance of each attitude control component to accomplish one or more desired aircraft maneuvers. For example, pitch attitude control component may be the highest priority, followed by roll, lift, and yaw attitude control components. In another example, the relative priority of the attitude components may be specific to an environment, aircraft maneuver, mission type, aircraft configuration, or other factors, to name a few. Torque allocator may set the highest priority attitude control component torque allocation as close as possible given the torque limits as described in this disclosure to the original command for the higher-priority attitude control component, in the illustrative example, pitch, then project to the value possible for the lower priority attitude control component, in this case, lift. The higher priority attitude control component in the first torque allocation may be the attitude control component with the highest overall priority. This process may be then repeated with lower priority attitude control component from the above comparison and the next highest down the priority list. In a non-limiting illustrative example, the next two-dimensional torque allocation problem solved would include lift and roll attitude control commands. In embodiments, the lower priority attitude command component has already been set form the previous two-dimensional torque allocation, so this may be projecting the closest possible value for the third-level attitude command (roll in this example). This process would repeat again for the third and fourth attitude components, in this non-limiting example, roll and yaw attitude control components. Since roll may be prioritized over yaw, the roll attitude control command would be preserved, and yaw would be sacrificed as a function of the vehicle torque limits as described herein. After the sequence of two-dimensional attitude control component torque allocation are completed and four prioritized attitude component commands are set, one or more components may send out commands to flight control surfaces/propulsors to generate the set torque values allocated in the foregoing process. As a non-limiting example of one step in the torque allocation process, pitch axis may represent the command or plurality of attitude commands inputted to the mixer as described herein, such as moment datum 140. Pitch axis may be conditioned or altered to be inputted to the mixer. For example, and without limitation, initial vehicle torque signal may include pitch and lift commands within plurality of attitude commands. The mixer may also receive at least a moment datum 140, which may be represented without limitation by a box plotted within the pitch and lift axes. A point where pitch command and lift command intersect may represent initial vehicle torque signal as projected onto exemplary graph of pitch and lift axes, which may be the same or similar to initial vehicle torque signal as disclosed in the entirety of this disclosure. The mixer utilizes prioritization data as described in the entirety of this disclosure to solve this two-dimensional problem by preserving the higher priority command and sacrificing the lower priority command. This prioritization preservation process may be illustrated, as a non-limiting example by placement of a modified attitude command, wherein the pitch command was preserved (horizontally translated and therefore unchanged from the initial command), while the lift command was lessened to bring the modified attitude command within vehicle torque limits (the box). The modified attitude command, as discussed in the entirety of this disclosure, may be further combined, modified, conditioned, or otherwise adjusted to produce output torque command to the plurality of propulsors. The remaining vehicle torque represents the remaining torque capability in one or more propulsors before, during, and after an aircraft maneuver. The remaining vehicle torque may include an individual propulsor's remaining torque capability, one or more of pitch, roll, yaw, and lift, capabilities of one or more propulsors, the remaining vehicle-level torque or power for subsequent maneuvers. The remaining vehicle torque may be displayed to a pilot or user. The above-described may be a non-limiting example of one step in the torque allocation process. The torque allocation process may be similar, or the same process as described above with the torque limits adjusted for inertia compensation. The mixer may be disposed fully or partially within mixer any mixer as disclosed herein. The mixer may include one or more computing devices as described herein. The mixer also receives at least a vehicle torque limit represented by an imaginary box plotted within the pitch and lift axes, which may be the same as, or similar to at least a vehicle torque limit. Here instead of the box being made of straight linear sides, the inertia compensation as previously discussed creates curved limits, wherein certain plurality of attitude commands may be allowed whereas without inertia compensation they would be outside of the limits. Where the pitch command and lift command intersect may be the initial vehicle torque signal, which may be the same or similar to initial vehicle torque signal as disclosed in the entirety of this disclosure. The mixer utilizes prioritization data as described in the entirety of this disclosure to solve this two-dimensional problem by preserving the higher priority command and sacrificing the lower priority command. This prioritization preservation process may be shown by the placement of modified attitude command, wherein the pitch command was preserved (horizontally translated and therefore unchanged from the initial command), while the lift command was lessened to bring the modified attitude command within vehicle torque limits (the box). The torque allocation effectively commands the amount of torque to one or more propulsors to accomplish the closest vehicle level torque to initial vehicle torque signal as possible given certain limits, maneuvers, and aircraft conditions. Modified attitude command, as discussed in the entirety of this disclosure, may be further combined, modified, conditioned, or otherwise adjusted to produce output torque command to the plurality of propulsors. The remaining vehicle torque represents the remaining torque capability in one or more propulsors before, during, and after an aircraft maneuver. The remaining vehicle torque may include an individual propulsor's remaining torque capability, one or more of pitch, roll, yaw, and lift, capabilities of one or more propulsors, the remaining vehicle-level torque or power for subsequent maneuvers.

With continued reference to FIG. 1, computing device 112 may be configured to perform the torque allocation on a plurality of flight components. In a non-limiting embodiment, the torque allocation may include a set of instructions that follows the flight mimicking aircraft recommendation 152 and/or the aircraft recommendation model. In a non-limiting embodiment, computing device 112 may be configured to display the torque allocation to user device 140. User device 140 is configured to present, to a user, the remaining vehicle torque. User device 140 may include a graphical user interface, multi-function display (MFD), primary display, gauges, graphs, audio cues, visual cues, information on a heads-up display (HUD) or a combination thereof. User device 140 may include a display disposed in one or more areas of an aircraft, on a user device remotely located, one or more computing devices, or a combination thereof. User device 140 may be disposed in a projection, hologram, or screen within a user's helmet, eyeglasses, contact lens, or a combination thereof. In a non-limiting embodiment, user device may be configured to display information in graphical form which may include a two-dimensional plot of two variables in that represent real-world data, such as pitch torque vs. roll torque of an aircraft. In a non-limiting example, a graphical representation of an electric aircraft may show arrows, levels, bar graphs, percentages, or another representation of remaining vehicle torques in a plurality of planes of motion such as pitch moment, roll moment, yaw moment, and lift force, individually or collectively. Remaining vehicle torque may include remaining vehicle torque capability in an aircraft's pitch moment. Remaining vehicle torque may include the remaining vehicle torque capability in an aircraft's roll moment.

Figure 2:
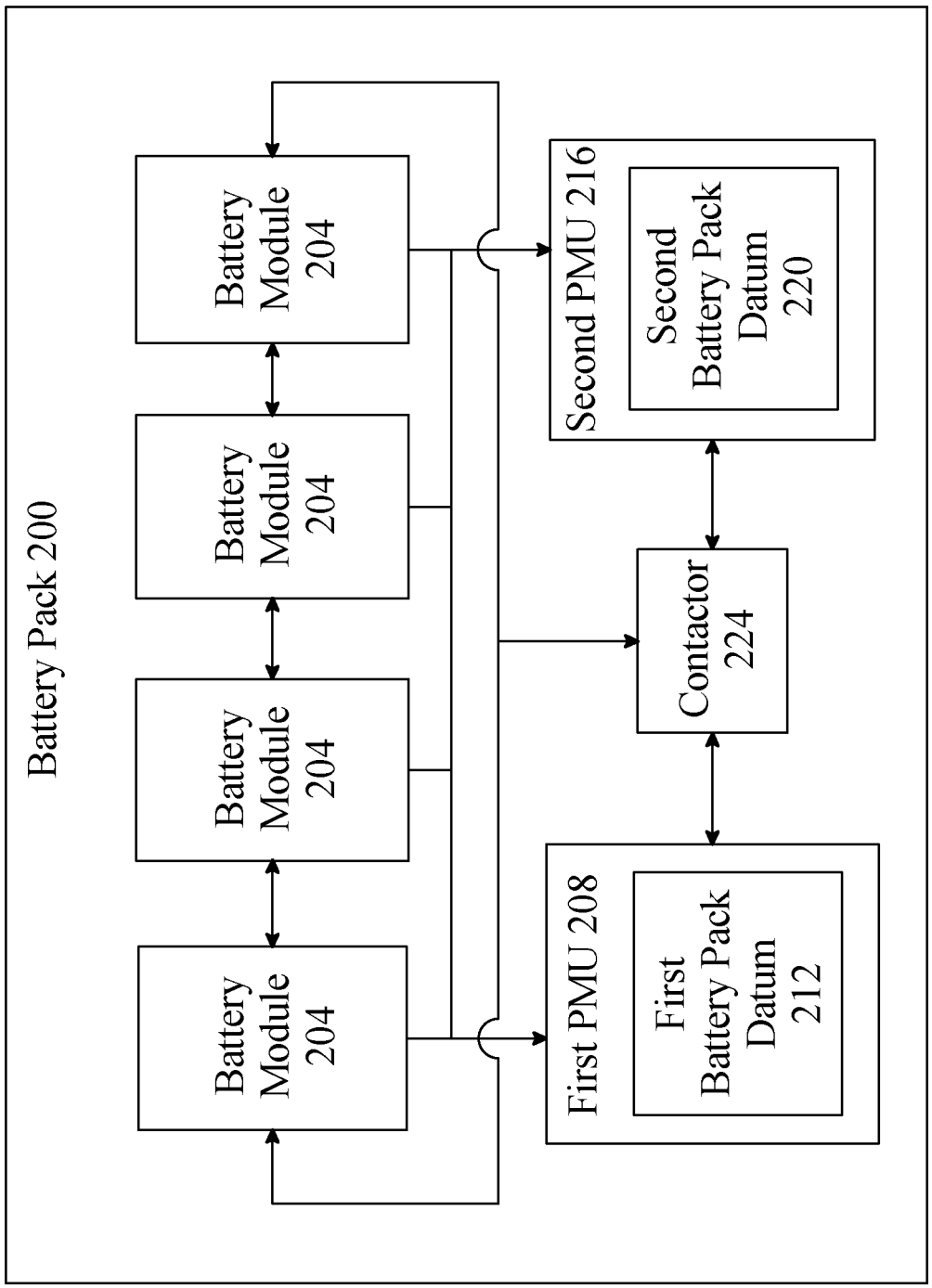
FIG. 2 is a block diagram illustrating an exemplary embodiment of a battery pack.

Referring now to FIG. 2, a block diagram illustrating an exemplary embodiment of battery pack 200 is provided. A "battery pack," for the purpose of this disclosure, is a set of any number of individual battery modules 204 or identical battery modules configured to power the electric aircraft. A "battery module", for the purpose of this disclosure, is a source of electric power consisting of one or more electrochemical cells. Battery pack 200 may include a plurality of battery packs. In a non-limiting embodiment, battery module 204 may include a battery cell and/or a plurality of battery cells. In a non-limiting embodiment, battery module 204 may be electrically connected to another battery module of a plurality of battery modules. "Electrical connection," for the purpose of this disclosure, is a link that allows of the transfer of electrical energy from one electric device to another. For example and without limitation, battery modules 204 may work in tandem with each to power a flight component. For example and without limitation, a battery module may compensate for a faulty battery module. In a non-limiting embodiment, battery modules 204 may include at least a cell, such as a chemoelectrical, photo electric, or fuel cell. Battery pack 200 may include, without limitation, a generator, a photovoltaic device, a fuel cell such as a hydrogen fuel cell, direct methanol fuel cell, and/or solid oxide fuel cell, or an electric energy storage device; electric energy storage device may include without limitation a capacitor, an inductor, an energy storage cell and/or a battery. Battery pack 200 may be capable of providing sufficient electrical power for auxiliary loads, including without limitation lighting, navigation, communications, de-icing, steering or other systems requiring power or energy. In a non-limiting embodiment, battery pack 200 may be capable of providing sufficient power for controlled descent and landing protocols, including without limitation hovering descent or runway landing. Plurality of battery packs may include a device for which power that may be produced per unit of volume and/or mass has been optimized, at the expense of the maximal total specific energy density or power capability, during design. Battery pack 200 may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations. In a non-limiting embodiment, battery pack 200 may include a plurality of electrochemical cells. In a non-limiting embodiment, battery pack 200 may be configured to deliver electrical power to a plurality of electrical systems of an electric aircraft. In a non-limiting embodiment, each battery pack 200 of the plurality of battery packs may work in tandem to provide electrical energy to a plurality of electrical systems of an electric aircraft. For example and without limitation, battery pack 200 may be used to power a flight component or a set of flight components. For example and without limitation, each battery pack 200 may be used to power unique flight components or a unique set of flight components. The flight component may be consistent with any flight component described in the entirety of this disclosure. Battery pack 200 may include a battery management system integrated into battery pack 200. For instance and without limitation, battery management system may be consistent with the disclosure of any battery management system in U.S. patent application Ser. No. 17/128,798 and title "SYSTEMS AND METHODS FOR A BATTERY MANAGEMENT SYSTEM INTEGRATED IN A BATTERY PACK CONFIGURED FOR USE IN ELECTRIC AIRCRAFT," which is incorporated herein by reference in its entirety. Persons skilled in the art, upon reviewing the entirety of this disclosure, will be aware of the various flight components that may represent battery pack 200 consistently with this disclosure.

With continued reference to FIG. 2, battery pack 200 may include at least a pack monitor unit (PMU). A "pack monitor unit," for the purpose of this disclosure, is any measuring device configured to capture information regarding a battery pack including batter modules. In a non-limiting embodiment, the at least a PMU may include a sensor. For example and without limitation, sensor 104 may include the at least a PMU. In a non-limiting embodiment, the at least a PMU may include one or more PMUs wherein each PMU is configured to detect information. In a non-limiting embodiment, the plurality of PMUs may be used to compare if the data detected is the same to confirm if at least one of the PMUs is faulty. In a non-limiting embodiment, the plurality of PMUs may be used to measure volatile data in which multiple PMUs may assist in capturing any rapid changes of a data.

With continued reference to FIG. 2, in a non-limiting embodiment, the at least a PMU may include first PMU 208. In a non-limiting embodiment, the at least a PMU may include second PMU 216. A "first pack monitor unit," for the purpose of this disclosure, is a device configured to capture information regarding a battery pack. A "second pack monitor unit," for the purpose of this disclosure, is a device configured to capture information regarding a battery pack. In a non-limiting embodiment, first PMU 208 and second PMU 216 may be identical. In a non-limiting embodiment, second PMU 216 may be configured to detect data after first PMU 208. First PMU 208 and/or second PMU 216 may include a microcontroller. The first PMU 208 and/or second PMU 216 may include a sensor wherein the sensor may include any sensor as described herein. First PMU 208 may include a first sensor suite. First sensor suite may include a plurality of individual sensors. Second PMU 216 may include a second sensor suite. Second sensor suite may include a plurality of individual sensors. In a non-limiting embodiment, first sensor suite may be identical to the second sensor suite. First PMU 208 and/or second PMU 216 may include a temperature sensor, digital temperature sensor, temperature probe, thermistors, thermocouples, and the like thereof. A "temperature sensor," for the purposes of this disclosure, is a device that detects and measure hotness and coolness of a battery pack 200 and converts it into electrical signals. In a non-limiting embodiment, first PMU 208 may be identical to second PMU 216. In a non-limiting embodiment, first PMU 208 and second PMU 216 may be configured to measure identical targets. In a non-limiting embodiment, the at least first PMU may measure a different datum of a target the at least a second monitor unit may measure. In a non-limiting embodiment, first PMU 208 and/or second PMU 216 may be used to double check measuring of datum. In a non-limiting embodiment, first PMU 208 may be configured to detect first battery pack datum 212 initially and second PMU 216 may be configured to detect a second battery pack datum 220 after a time interval and/or buffer. For example and without limitation, second PMU 216 may be configured to begin detecting a second battery pack datum 220 ten nanoseconds after first PMU 208 detects the first battery pack datum 212 For example and without limitation, second PMU 216 may be configured to begin detecting a second battery pack datum 220 sixty seconds after first PMU 208 detects the first battery pack datum 212 Persons skilled in the art, upon reviewing the entirety of this disclosure, will be aware of the various purposes of detecting with a time buffer consistent with this disclosure.

With continued reference to FIG. 2, the at least a PMU may be configured to detect a battery pack datum. A "battery pack datum," for the purpose of this disclosure, is an element of data representative of one or more characteristics corresponding to at least a portion of battery pack 200 and/or its components. In a non-limiting embodiment, the battery pack datum may include any data and/or information about the state of battery pack 200. In a non-limiting embodiment, aircraft datum 104 may include the battery pack datum. In a non-limiting embodiment, the battery pack datum may include at least an electrical parameter which may include, without limitation, voltage, current, impedance, resistance, and/or temperature. Current may be measured by using a sense resistor in series with the circuit and measuring the voltage drop across the resister, or any other suitable instrumentation and/or methods for detection and/or measurement of current. Voltage may be measured using any suitable instrumentation or method for measurement of voltage, including methods for estimation as described in further detail below. Each of resistance, current, and voltage may alternatively or additionally be calculated using one or more relations between impedance and/or resistance, voltage, and current, for instantaneous, steady-state, variable, periodic, or other functions of voltage, current, resistance, and/or impedance, including without limitation Ohm's law and various other functions relating impedance, resistance, voltage, and current with regard to capacitance, inductance, and other circuit properties. In a non-limiting embodiment, the battery pack datum may include first battery pack datum 212 and second battery pack datum 220 detected by first PMU 208 and second PMU 216 respectively.

With continued reference to FIG. 2, first PMU 208 may be configured to detect first battery pack datum 212. Second PMU 216 may be configured to detect a second battery pack datum 220. A "first battery pack datum," for the purpose of this disclosure, is any battery pack datum and/or an element of data representing physical attributes of battery pack 200 detected by first PMU 208. A "second battery pack datum," for the purposes of this disclosure, is any battery pack datum and/or an element of data representing physical attributes of battery pack 200 detected by second PMU 216. In a non-limiting embodiment, first battery pack datum 212 and second battery pack datum 220 may be identical. In a non-limiting embodiment, second battery pack datum 220 may be detected after first battery pack datum 212. First battery pack datum 212 and/or second battery pack datum 220 may include an identical datum of information. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. The plurality of datum captured by sensor may include circuitry, computing devices, electronic components or a combination thereof that translates into at least an electronic signal configured to be transmitted to another electronic component. First battery pack datum 212 and/or second battery pack datum 220 may include identification numbers for a battery pack of a plurality of battery packs. In a non-limiting embodiment, computing device 232 may assign first battery pack datum 212 and/or second battery pack datum 220 to a unique battery pack. First battery pack datum 212 and/or second battery pack datum 220 may include information describing, but not limited to, a voltage, resistance, current, impedance, distance traveled, and the like thereof. In a non-limiting embodiment, first battery pack datum 212 may be different from second battery pack datum 220. For example and without limitation, first battery pack datum 212 may include a voltage of a battery pack 200 to be 800 volts while second battery pack datum 220 may include a voltage of a battery pack 200 to be 700 volts. For example and without limitation, first battery pack datum 212 may include a current of a battery pack 200 to be 200 kWh while second battery pack datum 220 may include a voltage of a battery pack 200 to be 80 kWh volts. First battery pack datum 212 and/or second battery pack datum 220 may include a temperature datum. A "temperature datum," for the purposes of this disclosure, is any datum or element of data describing the temperature of a battery pack. Temperature datum may include a heating parameter and a cooling parameter. Heating parameter may include a rate of temperature increase of a battery pack 200. Cooling parameter may include a rate of temperature decrease of a battery pack 200. For example and without limitation, temperature datum may include a temperature of 60 to 80 degrees Fahrenheit. For example and without limitation, cooling parameter may include a temperature of a battery to be any temperature below 40 degrees Fahrenheit. For example and without limitation, heating parameter may include a temperature of a battery to be any temperature above 200 degrees Fahrenheit. In a non-limiting embodiment, the temperature datum of first battery pack datum 212 may be different from the temperature datum of second battery pack datum 220. For example and without limitation, temperature datum of first battery pack datum 212 may include a temperature of a battery pack 200 to be 70 degrees Fahrenheit while second battery pack datum 220 may include a temperature of battery pack 200 to be 200 degrees Fahrenheit. In a non-limiting embodiment, first battery pack datum 212 and/or second battery pack datum 220 may include total flight hours that battery pack 200 and/or electric aircraft have been operating. The first battery pack datum and/or second battery pack datum 220 may include total energy flowed through battery pack 200. The first battery pack datum and/or second battery pack datum 220 may include a maintenance history of battery pack 200. The first battery pack datum and/or second battery pack datum 220 may include an upper voltage threshold. The first battery pack datum and/or second battery pack datum 220 may include a lower voltage threshold. The first battery pack datum and/or second battery pack datum 220 may include a moisture level threshold.

With continued reference to FIG. 2, battery pack 200 may include contactor 224. A "contactor", for the purpose of this disclosure, is an electrically-controlled switch used for switching an electrical power of any of the load devices supplied by the battery. In a non-limiting embodiment, contactor 224 may include a load device of a plurality of load devices. A "load device," for the purpose of this disclosure, is an electrical component that is configured to consume electric power. In a non-limiting embodiment, load device may include a load switch. Contactor 224 may include an electromagnetic switch. Contactor 224 may include a switching functionality for a plurality of load device devices. Contactor may include at least a load device switch. Contactor 224 may include a high voltage connection which may include any high voltage connection. Contactor 224 may include, but not limited to, a high voltage current sense, a high voltage pyro fuse, a high voltage contactor, a ground fault detection, and the like thereof. In a non-limiting embodiment, contactor 224 may be configured to switch off a plurality of load devices in order to safely disconnect a battery pack from the electric aircraft. In a non-limiting embodiment, contactor 224 may include, but not limited to, a port, a pair of terminals, and the like thereof. In a non-limiting embodiment, contactor 224 may be configured to switch off a plurality of load devices that connect each battery module of the plurality of battery modules 204 to each other and/or the rest of the electric aircraft such as its flight components. For example and without limitation, computing device 112 may instruct contactor 224 to connect and/or disconnect each battery module of the plurality of battery modules 204 as a function of a load device.

With continued reference to FIG. 2, battery pack 200 may include a load device of a plurality of load devices electrically coupled to the plurality of battery packs and/or battery modules. The load device may include, without limitation, a plurality of load devices; plurality of load devices may be communicatively coupled to each battery pack 200 of the plurality of battery packs. "Electrically coupled," for the purpose of this disclosure, is a connection and/or link configured to transfer electrical energy between electrical components such as, but not limited to, circuits. "Communicatively coupled," for the purposes of this disclosure, is a connection and/or link between two or more components electrically, or otherwise connected and configured to transmit and receive signals from one another. Signals may include electrical, electromagnetic, visual, audio, radio waves, or another undisclosed signal type alone or in combination. A "load devices," for the purpose of this disclosure, is a grouping of electrical components such as electrical load devices that are used to consume electric power. The load device of the plurality of load devices may include an electrical component or a portion of an electrical circuit configured to actively consume electric power. The load device may comprise a component of the aircraft that is powered by the plurality of battery packs. The load device may include any load device configured to receive any current. In a non-limiting embodiment, a plurality of load devices may be communicatively coupled a plurality of battery packs of an electric aircraft. In a non-limiting embodiment, each load device may be individually wired to each battery pack of the plurality of battery packs. For example and without limitation, each load device may be configured to be switched off by computing device 232 for the purposes of maintaining continuous power output of a plurality of battery packs operating in tandem. In a non-limiting embodiment, the load device may include, but not limited to, a port, a pair of terminals, and the like thereof. For example and without limitation, each load device may be configured to disconnect a battery pack from an electric aircraft safely without interrupting or harming the electric aircraft and its operations. For example, the load device may comprise a motor, a fan, a processor, avionics, or any appropriate load device. The diodes allow current to flow in one direction but prevent current from flowing in the opposite direction. In a non-limiting embodiment, the diodes may allow current to flow towards the load device and prevent current from flowing toward the plurality of battery cells. In some embodiments, parallel battery cells used are identical. In a non-limiting embodiment, a higher voltage battery in parallel with a lower voltage battery without diodes present may result in charge flowing from the higher voltage battery to the lower voltage battery, causing battery failure. In a non-limiting embodiment, diodes may electrically isolate the parallel batteries, preventing charge shuttling between the batteries and providing a protective measure. In a non-limiting embodiment, the presence and placement of diodes in relation to the parallel batteries may enable the batteries to operate as independent entities. In a non-limiting embodiment, each parallel battery is independently wired to each individual load device. For example and without limitation, with distributed wiring, the parallel batteries do not share positive and negative buses. For example, an electric aircraft may comprise twelve lift fans and three forward propulsion motors that require power. Each parallel battery of the aircraft may be individually wired to each fan and motor. In a non-limiting embodiment, distributed wiring may eliminate a single point of failure in the aircraft by providing redundancy. For example and without limitation, in the event a short occurs between the positive and negative terminals of one battery, only the one battery may be affected. In a non-limiting embodiment, the load devices of the aircraft may remain powered and unaffected due to connections to other batteries. In a non-limiting embodiment, each load device may be individually wired to every parallel battery in the system. For example and without limitation, a large wire harness may be utilized due to the many wires. In a non-limiting embodiment, the most redundancy may be achieved in the event every battery is individually wired to every load device. In some embodiments, the parallel batteries may be grouped together (e.g. in a pack) wherein each group is connected to a shared positive bus and a shared negative bus. In a non-limiting embodiment, each group may be separately wired to every load device. In a non-limiting embodiment, six load devices may be present on one wing of the electric aircraft. In some embodiments, another six load devices are present on another wing of the aircraft. Each parallel battery may include its own wiring to the six load devices. Each battery as shown has six wires attached at its positive terminal and six wires attached at its negative terminal. The six wires attached at the positive terminal may each connect the battery to a positive terminal of one of the six load devices. The six wires attached at the negative terminal may connect the battery to negative terminals of the six load devices. Persons skilled in the art, upon reviewing the entirety of this disclosure, will be aware of the various embodiments of load devices for the purposes as described herein.

With continued reference to FIG. 2, contactor 224 may be configured to communicate with a bus element. In a non-limiting embodiment, computing device 232 may communicate such instructions via the bus element. A "bus element," for the purpose of this disclosure, is an electrically conductive pathway connecting at least a component in a system configured to convey electrical energy between components. For instance and without limitation, the bus element may be consistent with bus element in U.S. patent application Ser. No. 27/348,240 and titled "SYSTEM AND METHOD FOR DYNAMIC EXCITATION OF AN ENERGY STORAGE ELEMENT CONFIGURED FOR USE IN AN ELECTRIC AIRCRAFT," which is incorporated herein by reference in its entirety. In a non-limiting embodiment, the bus element may include one or more electrically conductive pathways configured to transfer electrical energy across the pathways to convey electrical energy from one component to one or more other components. The bus element may include, without limitation, one or more metallic strips and/or bars. In a non-limiting embodiment, the bus element may include a ring bus. For the purpose of this disclosure, a "ring bus" is a bus element wherein circuit breakers are connected to form a ring with isolators on both sides of each circuit breaker. For instance and without limitation, the ring bus may be consistent with ring bus found in U.S. patent application Ser. No. 27/348,240 and titled "SYSTEM AND METHOD FOR DYNAMIC EXCITATION OF AN ENERGY STORAGE ELEMENT CONFIGURED FOR USE IN AN ELECTRIC AIRCRAFT," which is incorporated herein by reference in its entirety. In a non-limiting embodiment, ring bus may include component configured to isolate a fault by tripping two circuit breakers while all other circuits remain in service. The bus element may be disposed in or on a switchgear, panel board, busway enclosure, plurality of energy storage elements, any portion of electric aircraft, plurality of flight components, or a combination thereof. The bus element may also be used to connect high voltage equipment at electrical switchyards, and low voltage equipment in plurality of energy storage elements. The bus element may be uninsulated; the bus element may have sufficient stiffness to be supported in air by insulated pillars. These features allow sufficient cooling of the conductors, and the ability to tap in at various points without creating a new joint. The bus element may include material composition and cross-sectional size configured to conduct electricity where the size and material determine the maximum amount of current that can be safely carried. The bus element may be produced in a plurality of shapes including flat strips, solid bars, rods, or a combination thereof. The bus element may be composed of copper, brass, aluminum as solid or hollow tubes, in embodiments. The bus element may include flexible buses wherein thin conductive layers are sandwiched together; such an arrangement may include a structural frame and/or cabinet configured to provide rigidity to the bus element. The bus element may include distribution boards configured to split the electrical supply into separate circuits at one location. Busways, or bus ducts, are long busbars with a protective cover. Rather than branching from the main supply at one location, they allow new circuits to branch off anywhere along the route of the busway. The bus element may either be supported on insulators, or else insulation may completely surround it. Busbars are protected from accidental contact either by an enclosure or by design configured to remove it from reach. The bus element may be connected to each other and to electrical apparatus by bolted, clamped, or welded connections. Joints between high-current the bus element sections have precisely machined matching surfaces that are silver-plated to reduce the contact resistance. Persons skilled in the art, upon reviewing the entirety of this disclosure, will be aware various embodiments of a busbar for purposes described herein.

With continued reference to FIG. 2, the bus element may include a higher level contactor. A "higher level contactor," for the purpose of this disclosure, is a device or protocol configured to disconnect and electrically isolate a portion of elements connected to a bus element from the rest of the elements connected to bus element. "Disconnect", as used in this disclosure, is any break and/or interruption in a connection. In a non-limiting embodiment, the higher level contactor may include any contactor as described in the entirety of this disclosure. In a non-limiting embodiment, the higher level contactor may be connected to the bus element. In a non-limiting embodiment, the higher level contactor may be configured to connect with a plurality of contactors 224 of a plurality of battery packs. In a non-limiting embodiment, the higher level contactor may be configured to disconnect a battery pack from another battery pack. The higher level contactor may include a mechanical, electromechanical, hydraulic, pneumatic, or other type of device configured to actuate a portion of the bus element. The higher level contactor may include one or more relays connected to an electrical circuit configured to open or close another circuit as a function of the manipulation of a separate electrical circuit. For example, and without limitation, the higher level contactor may be configured to receive a datum, more than one elements of data, command, signal, or other communication to engage or disengage to disconnect at least a portion of battery packs. The higher level contactor may include a switch configured to operate in one of two positions, an open and a closed position. The higher level contactor may include electrically actuated switches including transistors, bipolar junction transistors (BJT), field-effect transistors (FETs), metal oxide field-effect transistors (MOSFETs), a combination thereof, or other nondisclosed elements alone or in combination. In a non-limiting embodiment, the upper level contactor may include a cross tie element. For instance and without limitation, the cross tie element may be consistent with cross tie element in U.S. patent application Ser. No. 27/348,240 and titled "SYSTEM AND METHOD FOR DYNAMIC EXCITATION OF AN ENERGY STORAGE ELEMENT CONFIGURED FOR USE IN AN ELECTRIC AIRCRAFT," which is incorporated herein by reference in its entirety. In a non-limiting embodiment, plurality of battery packs may be combined and/or detached from one another using one or more cross tie elements. For instance, and without limitation, disconnection of the higher level contactor may isolate a single battery pack of a plurality of battery packs from all other battery packs and/or may isolate a first plurality of battery packs from a second plurality of battery packs. More generally, any number of cross tie elements may operate to divide the plurality of battery packs into various different groups and/or isolate any single energy storage unit one by one or two or more at a time. Where the higher level contactor separates a first energy storage unit from a second energy storage unit, either of first or second energy storage unit may be part of a plurality of battery packs that remain interconnected and/or may be isolated from all other battery packs. Persons skilled in the art, upon reviewing the entirety of this disclosure, will be aware of the various embodiments of hierarchical contactors for purposes as described herein.

Figure 3:
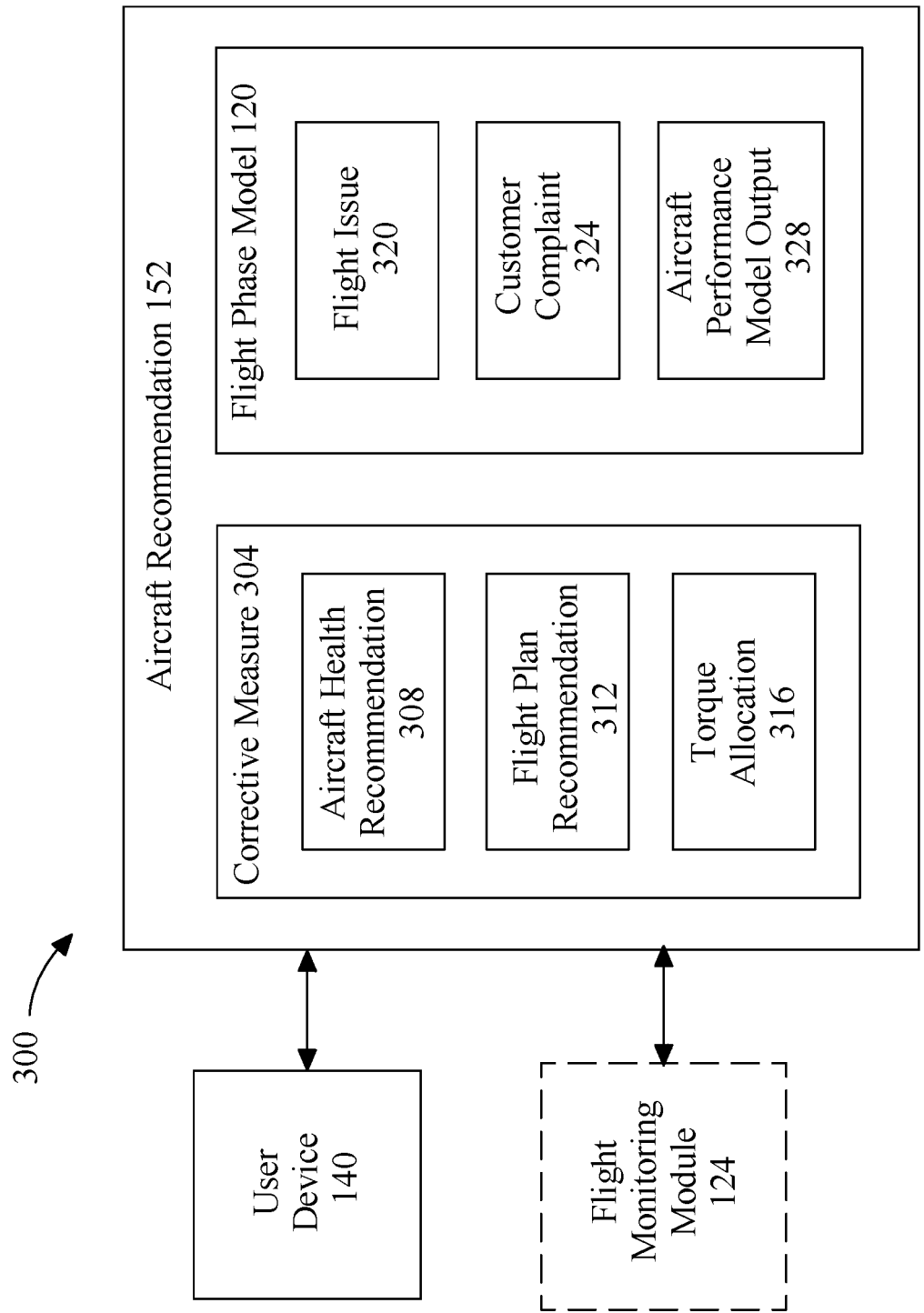
FIG. 3 is a block diagram of an exemplary embodiment of an aircraft recommendation.

Referring now to FIG. 3, a block diagram 300 of an exemplary embodiment of an aircraft performance model output 148 is provided. In a non-limiting embodiment, aircraft recommendation 152 may receive the status datum from flight monitoring module 124. Aircraft recommendation 152 may include corrective measure 304. A "corrective measure," for the purpose of this disclosure, is any command or plurality of commands that may improve the performance of the electric aircraft, the flight of the electric aircraft, and/or satisfy a user's request and tunable parameter 148. Corrective measure 304 may include aircraft health recommendation 308. An "aircraft health recommendation," for the purpose of this disclosure, is any recommendation that improves, maintains, and/or mitigates the performance, quality, and life span of the electric aircraft. For example and without limitation, aircraft health recommendation 308 may include a flight plan that enhances the longevity of the electric aircraft. This may include a recommendation to operate the electric aircraft at a cruising speed and a cruising altitude which may contribute to reducing power consumption and battery degradation. In a non-limiting embodiment, aircraft health recommendation 308 may include any signs, percentages, images, list of instructions, and the like thereof, to inform a pilot and/or user of parameters to consider or be cautious of. In a non-limiting embodiment, aircraft health recommendation 308 may include any state of health information for any flight component to be displayed on user device 140. For example and without limitation, aircraft health recommendation 308 may include a plurality of elements of data representing past, current, and/or predictive health statuses of a plurality of flight components of the electric aircraft. In a further non-limiting example, aircraft health recommendation 308 may include a projection or prediction of the health statuses of flight components after a scheduled or projected flight. For example and without limitation, aircraft health recommendation 308 may include a history and/or record of health statuses of the plurality of flight components. In a non-limiting embodiment, aircraft health recommendation 308 may include a maintenance schedule. The maintenance schedule may include any maintenance schedule described herein. The maintenance schedule may include a repair schedule. In a non-limiting embodiment, aircraft recommendation 152 may include a plurality of records of a plurality of maintenance schedules for a plurality of electric aircraft of a fleet of electric aircraft. In a non-limiting embodiment, the maintenance schedule may be affected by, in part, a user device 140. In a non-limiting embodiment, the maintenance schedule including a repair schedule may be generated as a function of a lowered health status of a flight component of an electric aircraft from aircraft datum 108. In a non-limiting embodiment, corrective measure 304 may include any maneuver to be made on the electric aircraft to satisfy aircraft recommendation 152. For example and without limitation, corrective measure 304 may include a plurality of maneuvers to satisfy objective constraint 144 and/or tunable parameter 148. In a non-limiting embodiment, corrective measure 304 may be depicted as a virtual representation including, but not limited to, flight phase model 120. Persons skilled in the art, upon reviewing the entirety of this disclosure, will be aware of the various embodiments aircraft health recommendation 308 may include for purposes as described herein.

With continued reference to FIG. 3, corrective measure 304 may include flight plan recommendation 312. A "flight plan recommendation," is a flight plan denoting the flight plan to be taken by the electric aircraft that satisfies user requirements. In a non-limiting embodiment, flight plan recommendation 312 may include a flight plan that leads the electric aircraft to the closest recharging station in the event the electric aircraft is low on energy, prioritized by the user as a requirement, and the like thereof. In a non-limiting embodiment, flight plan recommendation 312 may include aircraft and environmental information surrounding flight plan 116. In a non-limiting embodiment, corrective measure 304 may include a set of instructions, which may be displayed in any visual format, that satisfies the completion of flight plan 116. In a non-limiting embodiment, flight plan recommendation 312 may include a schedule of flight plans associated with the electric aircraft. Persons skilled in the art, upon reviewing the entirety of this disclosure, will be aware of the various embodiments of flight plan recommendation 312 and various information that may be significant for flight plan recommendation 312 for purposes as described herein.

With continued reference to FIG. 3, corrective measure 304 may include torque allocation 316. Torque allocation 316 may include any torque allocation as described in the entirety of this disclosure. In a non-limiting embodiment, torque allocation 316 may include any command that may be used to satisfy any recommendation as described herein. For example and without limitation, torque allocation 316 may include a set of instruction such as attitude rate, angle of attack, etc., that satisfies the completion of aircraft recommendation 152. Persons skilled in the art, upon reviewing the entirety of this disclosure, will be aware of the various commands to be followed for purposes as described herein.

With continued reference to FIG. 1, aircraft recommendation 152 may include flight phase model 120, which may include aircraft performance model output 328. In a non-limiting embodiment, flight simulator 116 may generate aircraft performance model output 328. A "aircraft performance model output," for the purpose of this disclosure, is any simulation and/or model of an electric aircraft that embodies an analytical and/or interactive visualization regarding aircraft operation and/or performance capabilities of the electric aircraft. In a non-limiting embodiment, performance model output 328 may include a plurality of aircraft performance model output. For example and without limitation, plurality of aircraft performance model output 328 may include a plurality of simulations of the electric aircraft using the plurality of flight data with each model providing, for each flight component in the set of flight components corresponding, force and moment data for each of a first set of operating conditions based on a first set of simulations performed by varying one or more flight component parameters while holding other flight components at a baseline value and a second set of simulations to determine interactions between the flight component and said other actuators under each of a second set of operating conditions. For example and without limitation, a first set may include a simulation representing one flight component and/or one set of flight components performing as a function of varied flight component parameters while the remaining flight components are configured to be at a cruise control in order to realize the strength, performance, and/or physical qualities of that first set. In a non-limiting embodiment, a second set may repeat a similar procedure as the first set but with a different flight component or a different set of flight components.

With continued reference to FIG. 3, aircraft performance model output 328 may include at least a battery performance model. A "battery performance model," for the purpose of this disclosure, is any model or simulation depicting quantifiable metrics of a battery source of an electric aircraft of any first vehicle performance model output 228. The battery model may include any model related to at least property, characteristic, or function of a battery located within aircraft. In some cases, the battery model may include a model of a battery controller, management, and/or monitoring system. Disclosure related to battery management for eVTOL aircraft may be found in patent application Ser. Nos. 17/108,798 and 17/111,002, entitled "PACK LEVEL BATTERY MANAGEMENT SYSTEM" and "ELECTRICAL DISTRIBUTION MONITORING SYSTEM FOR AN ELECTRIC AIRCRAFT," respectively, each of which is incorporated herein by reference in its entirety. In some cases, a battery model may include an electrochemical model of battery, which may be predictive of energy efficiencies and heat generation and transfer of at least a battery. In some cases, a battery model may be configured to predict battery lifetime, given known battery parameters, for example measured battery performance, temperature, utilization, and the like. In a non-limiting embodiment, the battery performance model may include a thermal performance. A "thermal performance," for the purpose of this disclosure, is any temperature related output or data regarding a battery. In a non-limiting embodiment, the battery performance model may include a battery performance metric which may include, but is not limited to, battery charge, battery health, battery temperature, and/or battery usage. In some embodiments, the battery performance model to suggest a better flight maneuver and/or path to preserve the battery of the electric aircraft. For example and without limitation, the battery performance metric may include the battery health, battery consumption rate, battery temperature, and the like thereof.

With continued reference to FIG. 3, aircraft performance model output 328 may include an artificially created model of a flight of an electric aircraft. In a non-limiting embodiment, a flight simulation may include graphical lines and images representing the electric aircraft and the path and distance an electric aircraft has traversed or is projected to traverse. In a non-limiting embodiment, the flight simulation may include a three-dimensional (3D) and a two-dimensional (2D) graphical representation of the flight of an electric aircraft. In a non-limiting embodiment, flight phase model 120 may include flight issue 328. A "flight issue," for the purposes of this disclosure, refer to a moment that represents an incident or occurrence of an issue in the flight of an aircraft. Flight issue 328 may include an aircraft failure, at least a degradation of an aircraft component, and an avionics glitch and the like thereof. In a non-limiting embodiment, flight issue 320 may include an incident that may be submitted by a user as a form of objective constraint 144 via input device 140. In a non-limiting embodiment, the flight simulation may generate a visual model that may include any shape, color, size, and the like thereof, denoting when and where flight issue 320 may have occurred in the duration of a flight as a function of the flight simulation. In a non-limiting embodiment, the flight simulation may be configured to generate a simulation of the parties involved that may have caused the flight issue that may include a simulation of passengers arguing with each other, a passenger arguing with a pilot, and the like thereof. In a non-limiting embodiment, the flight simulation may replicate and/or replay the flight of an electric aircraft in a graphical form. The replay of the flight may be generated as a function of the flight plan 116 authorized by the central authority 128.

With continued reference to FIG. 3, flight phase model 120 and/or the flight simulation of aircraft performance model output 328 may include a symbol indicating flight plan 116 of the electric aircraft as a form of a flight plan schedule. The symbol may include any shape, color, size, indicator, and the like thereof. The Flight simulation may include a warning sign indicating an issue concerning the flight plan. The warning sign may include any indicator that is configured to capture the attention of any user. A warning sign may be communicatively connected to a designed siren or sound configured to capture the attention of a user.

With continued reference to FIG. 3, flight simulation 324 may include customer complaint 332. A "customer complaint," for the purposes of this disclosure, refer to an issue related to an unfavorable experience by a customer. In a non-limiting embodiment, a customer complaint 332 may be flight issue 320 which may further be replicated or simulated as a function of the flight simulation. Complaints may include an aircraft personnel complaint which may include issues and/or complaints from the personnel of the aircraft such as the pilot, flight attendants, engineers, and the like. A person of ordinary skill in the art, after viewing the entirety of this application, would appreciate the different types of flight issues and complaints that may affect the quality of a flight.

With continued reference to FIG. 3, aircraft performance model output 328 may be generated using a digital twin. A "digital twin," for the purpose of this disclosure, is an up-to-date virtual representation of a physical component or process, for instance and without limitation an aircraft such as the electric vehicle. For instance and without limitation, the digital twin may be consistent with digital twin in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT" which is incorporated herein in its entirety.

With continued reference to FIG. 3, simulator machine 116 may be configured to simulate flight phase model 120 of the digital twin. As described in this disclosure, a "virtual representation" includes any model or simulation accessible by computing device which is representative of a physical phenomenon, for example without limitation at least a part of an electric vehicle such as an electric vehicle and/or its battery pack, or a simulator module. For instance and without limitation, the flight phase model 120 may be consistent with virtual representation in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT" which is incorporated herein in its entirety. In some cases, virtual representation may be interactive with simulator machine 116. Simulator machine 116 may include a flight simulator. For instance and without limitation, simulator machine 116 may be consistent with flight simulator in U.S. patent application Ser. No. 17/348, 916 and titled "METHODS AND SYSTEMS FOR SIMULATED OPERATION OF AN ELECTRIC VERTICAL TAKE-OFF AND LANDING (EVTOL) AIRCRAFT" which is incorporated herein in its entirety. For example, in some cases, data may originate from flight phase model 120 and be input into simulator machine 116. Alternatively or additionally, in some cases, flight phase model 120 may modify or transform data already available to simulator machine 116. Flight phase model 120 may include the digital twin of at least an aircraft component 116. Aircraft the digital twin may include any digital twin as described in this disclosure, for example below. In some cases, at least an aircraft component 116 includes an electric vertical take-off and landing (eVTOL) aircraft, for example a functional flight-worthy eVTOL aircraft; and aircraft the digital twin is a digital twin of the eVTOL aircraft. In some cases, at least a flight phase model 120 may include a virtual controller area network. Virtual controller area network may include any virtual controller area network as described in this disclosure.

With continued reference to FIG. 3, in some embodiments, the digital twin may model, simulate, predict, and/or determine an aspect of the electric aircraft using machine-learning processes, including any machine-learning process described in this application. The digital twin may include analytical models, for example those based upon known physical laws and phenomena, such as Newton's laws of motion. Alternatively and/or additionally, the digital twin may include data-driven models based largely on observed data, for example Monte-Carlo modeling and/or machine-learning processes. In some cases, the digital twin may be constituted of digital threads. According to some embodiments, a digital thread may be considered a lowest level design and specification for a digital representation of a physical item. Use of digital threads may, in some cases, ensure deep coherence between models of the digital twin. In some cases, the digital twin may include a design equation and/or design matrix. A design equation may mathematically represent some or all design requirements and parameters associated with a particular design, for example the electric aircraft.

Figure 4:
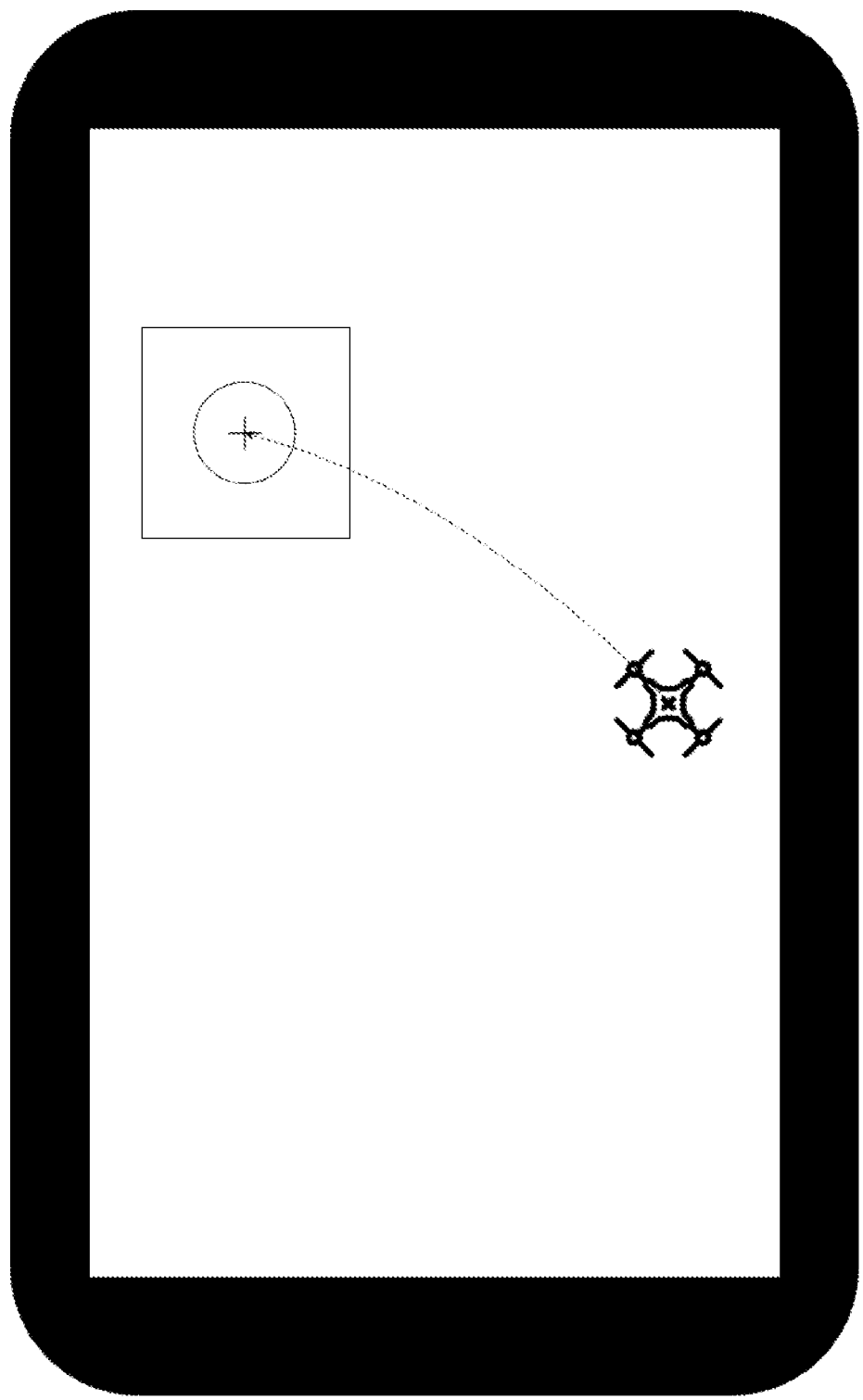
FIG. 4 is an exemplary screenshot a user device displaying an aircraft recommendation.

Now referring to FIG. 4, an exemplary screenshot of a user device displaying aircraft recommendation 152 is provided. In a non-limiting embodiment, the user device may incorporate touch screen capability. In one embodiment, user may select a point is space as a second potential landing zone by touching the desired point on the screen. In one embodiment, the user device may display landing locations where user may choose by clicking on the desired location. In a nonlimiting example, user may be presented with buttons in a map representing landing locations, where user may choose the desired location by clicking on a button. In another nonlimiting example, user may be able to select a second potential landing location and also an intermediate landing location, where controller will perform calculations as a function of the intermediate objective, and once reached, controller will calculate potential of the second landing.

Figure 5:
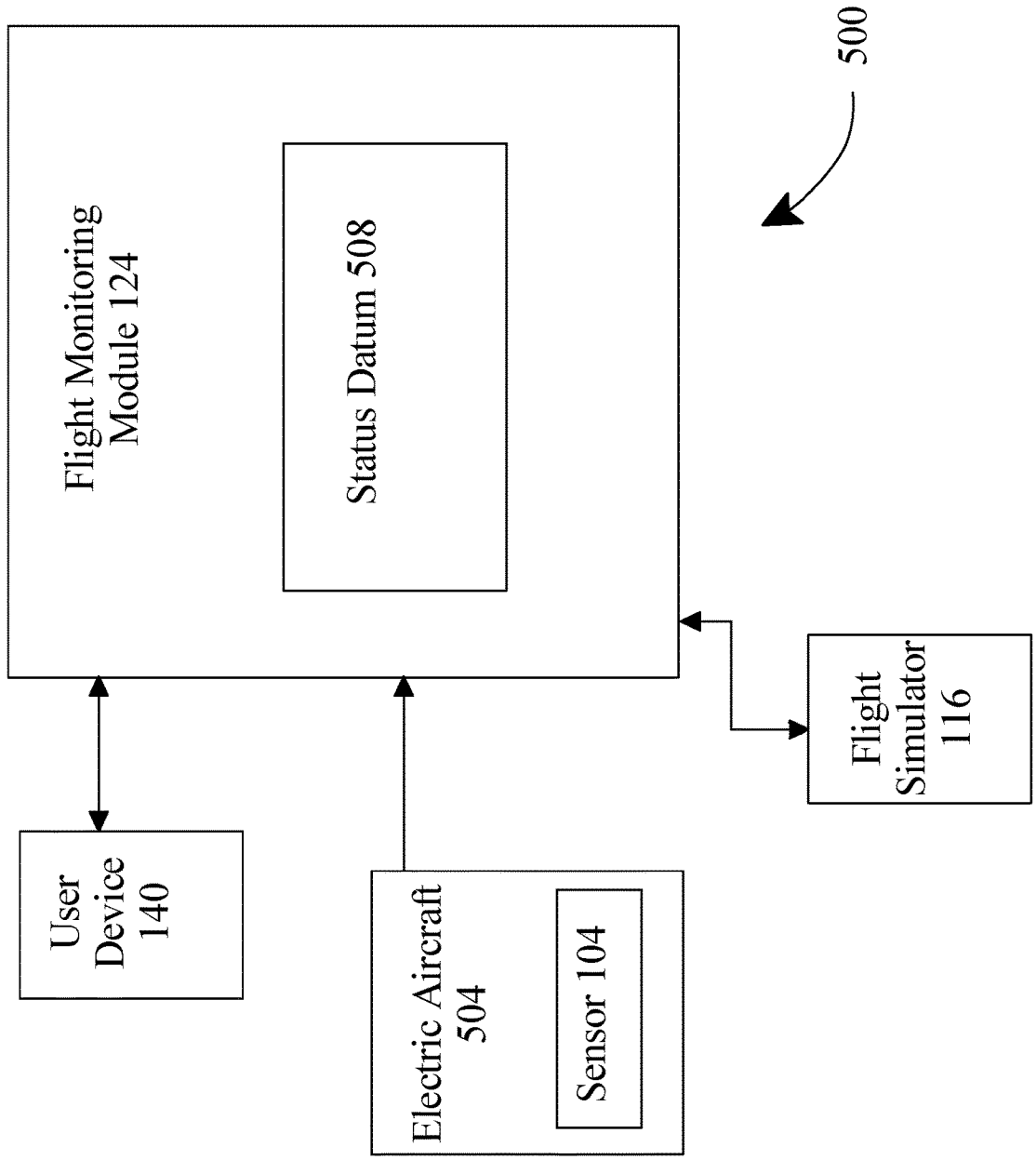
FIG. 5 is a block diagram illustrating an embodiment of a flight monitoring module.

Referring now to FIG. 5, a block diagram 500 illustrating an embodiment of flight monitoring module 124 is provided. Flight monitoring module 124 may include any suitable hardware and/or software module. Flight monitoring module 124 and/or computing device 112 may be configured to receive a status datum 508 from sensor 104 disposed on a plurality of controlling components of electric aircraft 504. The "status datum" as described in the entirety of this disclosure, is a measure of the functionality of the each controlling component. The measure of functionality may include data describing the health of each controlling component and/or controlling surface. For example and without limitation, the status datum 508 may include data detailing the health of each controlling component, such as the temperature of each controlling component, the amperage of each controlling component, the angle of each controlling component, the speed of each controlling component, damage of each controlling component, any combination thereof, and/or the like. Persons skilled in the art, upon reviewing the entirety of this disclosure, will be aware of various measures of functionality that may be employed as status datum 508 as described herein. The controlling component and/or controlling surface of electrical aircraft 504 may include any controlling component as described above in further detail in reference to FIG. 1. For example and without limitation, the controlling component may include a structural component and/or control surface of the electric aircraft 504. For example and without limitation, a structural component may include any component of the aircraft that utilizes power, such as the battery pack and/or battery modules, propulsor, rotor, and the like. As a further example and without limitation, the control surface may include any component of the aircraft, wherein movement of the component enables a pilot to control the flight altitude of the aircraft, such as ailerons, elevator, rudder, spoilers, flaps, slats, air brakes, tabs, winglet, vortex generators, chordwise barriers, and the like thereof.

Figure 6:
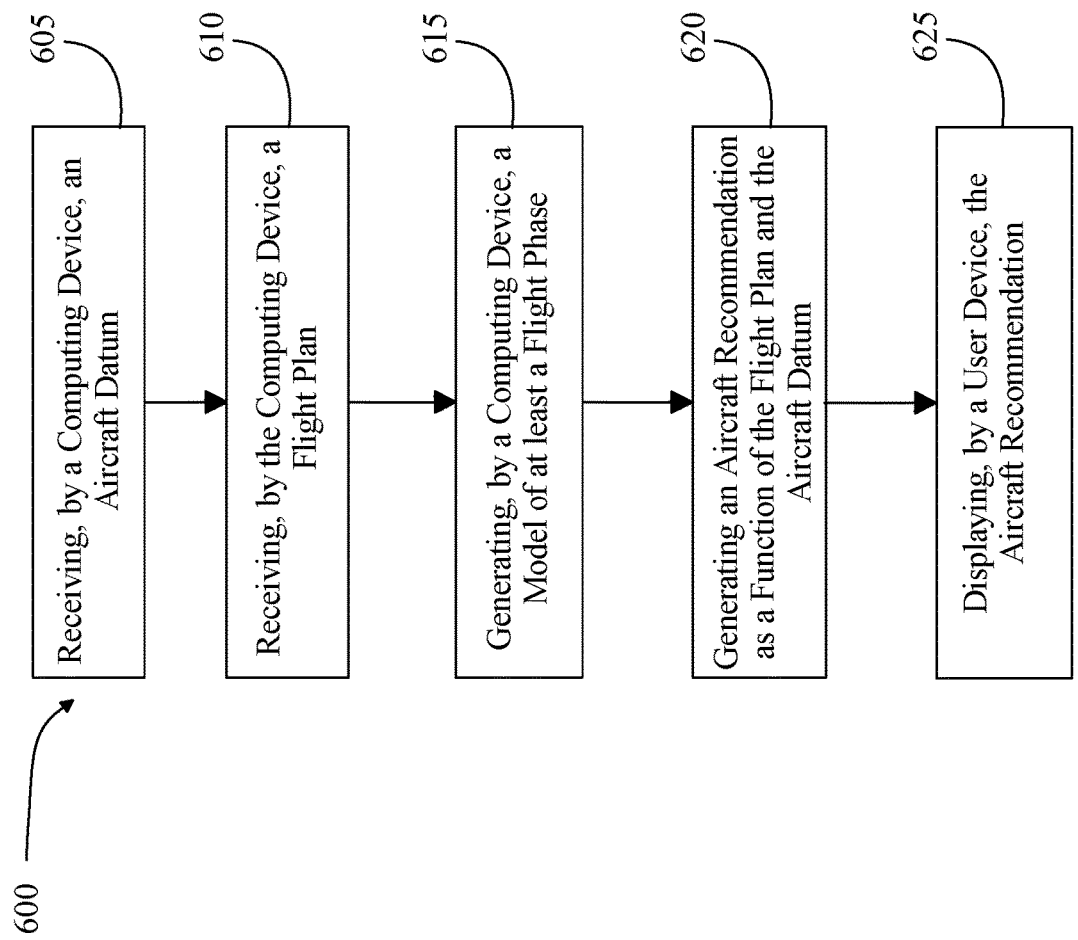
FIG. 6 is a flow diagram of an exemplary method for aircraft recommendation for an electric aircraft.

Now referring to FIG. 6, a flow diagram of an exemplary method 600 for aircraft recommendation for an electric aircraft is provided. Method 600, at step 605, may include receiving, by a computing device, an aircraft datum. The computing device may include any computing device as described herein. In a non-limiting embodiment, method 600, at step 605, may include receiving a sensor datum from a flight monitoring device. The sensor datum may include any sensor datum as described herein. The flight monitoring device may include any flight monitoring device as described herein. In a non-limiting embodiment, method 600, at step 605, may include receiving at least an objective constraint via a user device. The at least an objective constraint may include any objective constraint as described herein. as described herein. The user device may include any user device as described herein. In a non-limiting embodiment, method 60, at step 605, may include receiving a battery datum. The battery datum may include any battery datum as described herein. Persons skilled in the art, upon reviewing the entirety of this disclosure, will be aware will be aware of the various datum and methods of receiving the various datum for purposes as described herein.

With continued reference to FIG. 6, method 605, may include receiving the plurality of datum as a function of a sensor. The sensor may include any sensor as described herein. In a non-limiting embodiment, method 600 may include transmitting the plurality of datum to the computing device as a function of the sensor. In a non-limiting embodiment, transmitting and receiving may include the use of a virtual control area network. The virtual control area network may include any virtual control area network as described herein.

With continued reference to FIG. 6, method 600, at step 610, may include receiving, by the computing device, a flight plan. The flight plan may include any flight plan as described herein. In a non-limiting embodiment, the flight plan may be provided by a central authority acting as an air traffic control entity. The central authority may include any central authority as described herein. In a non-limiting embodiment, method 600, at step 610, may include operating an automated broadcaster wherein the automated broadcaster is configured to facilitate communication between the central authority and the computing device, the electric aircraft, and/or a user to receive and/or transmit any flight plans that may be required to be approved. Persons skilled in the art, upon reviewing the entirety of this disclosure, will be aware of the various methods of communication with an air traffic control acting as an authority for purposes as described herein.

With continued reference to FIG. 6, method 600 may include communicatively connecting the computing device to the user device as a function of a mesh network. In a non-limiting embodiment, connecting may include any form of digital communication as described herein. In a non-limiting embodiment, the mesh network may include any mesh network and/or network as described herein.

With continued reference to FIG. 6, method 600, at step 615, may include generating a model of at least a flight phase as a function of the aircraft datum and the flight plan. The model may include a flight phase model, wherein the flight phase model may include any flight phase model as described herein. In a non-limiting embodiment, method 600, at step 615, may include operating, by the computing device, a flight simulator. The flight simulator may include any flight simulator as described herein. In a non-limiting embodiment, method 600, at step 615, may include operating the flight simulator which may be located in a remote location. In a non-limiting embodiment, method 600 may include facilitating communication of the flight plan between the computing device and a central authority as a function of an automated broadcaster. In another non-limiting embodiment, method 600, at step 615, may include simulating, by the flight simulator, a virtual representation of the electric aircraft as a function of the aircraft datum and the flight plan. The virtual representation may include any virtual representation as described herein. In a non-limiting embodiment, method 600, at step 615, may include simulating an aircraft performance model output. The aircraft performance model output may include any aircraft performance model output as described herein. Simulating the aircraft performance model output may include simulating a plurality of aircraft performance model outputs.

With continued reference to FIG. 6, method 600, at step 620, includes generating, by the computing device, an aircraft recommendation as a function of the flight plan and aircraft datum. The aircraft recommendation may include any aircraft recommendation as described herein. In a non-limiting embodiment, method 600, at step 620, may include identifying a tunable parameter of the at least a flight phase. The at least a flight phase may include any flight phase as described herein. The at least a tunable parameter may include any tunable parameter as described herein. In a non-limiting embodiment, identifying the tuning parameter may include training a machine-learning model as a function of a training set and the at least an objective constraint. The machine-learning model may include any machine-learning model as described herein. The training set may include any objective constraint correlated to any tunable parameter that may have been stored and/or retrieved from a flight plan historical database. The flight plan historical database may include any flight plan historical database as described herein. In a non-limiting embodiment, generating the aircraft recommendation may include tuning the tunable parameter as a function of the model of the at least a flight phase and the at least an objective constraint. In a non-limiting embodiment, tuning the tunable parameter may include optimizing the at least an objective constraint as a function of a linear optimization. The linear optimization may include any linear optimization as described herein. In a non-limiting embodiment, method 600, at step 620 may include generating the aircraft recommendation as a function of the tuning of the tuning of the tunable parameter. In a non-limiting embodiment, method 600, at step 620, may include generating the aircraft recommendation as a function of a mixer. The mixer may include any mixer as described herein. In a non-limiting embodiment, method 600, at step 625, may include generating the aircraft recommendation further comprises generating a corrective measure. The corrective measure may include any corrective measure as described herein. For example and without limitation, generating the aircraft recommendation may include simulating virtual representation of the corrective measures as a function of the flight simulator. In a non-limiting embodiment, method 600, at step 625, may include generating the aircraft recommendation further comprises generating a torque allocation. The torque allocation may include any torque allocation as described herein.

With continued reference to FIG. 6, method 600 may include receiving, by the computing device, an input datum as a function of the user device, and generating the aircraft recommendation as a function of the at least an objective constraint. The at least an objective constraint may include any user input as described herein. In a non-limiting embodiment, generating the aircraft recommendation datum may include incorporating user preferences. Persons skilled in the art, upon reviewing the entirety of this disclosure, will be aware of the various methods incorporating user inputs as described herein.

With continued reference to FIG. 6, method 600, at step 620 may include training a training a machine-learning model as a function of a recommendation training set and outputting an aircraft recommendation model as a function of the aircraft datum, the flight plan, and the machine-learning model. The recommendation training set may include any recommendation training set as described herein. In a non-limiting embodiment, the recommendation training set may be retrieved from the flight plan historical database. Persons skilled in the art, upon reviewing the entirety of this disclosure, will be aware of the various methods for generating a recommendation using machine-learning for purposes as described herein.

With continued reference to FIG. 6, method 600, at step 625, may include displaying, by a user device, the aircraft recommendation. In a non-limiting embodiment, method 625, may include displaying the aircraft recommendation on a user device. Persons skilled in the art, upon reviewing the entirety of this disclosure, will be aware of the various methods of displaying for purposes as described herein.

Figure 7:
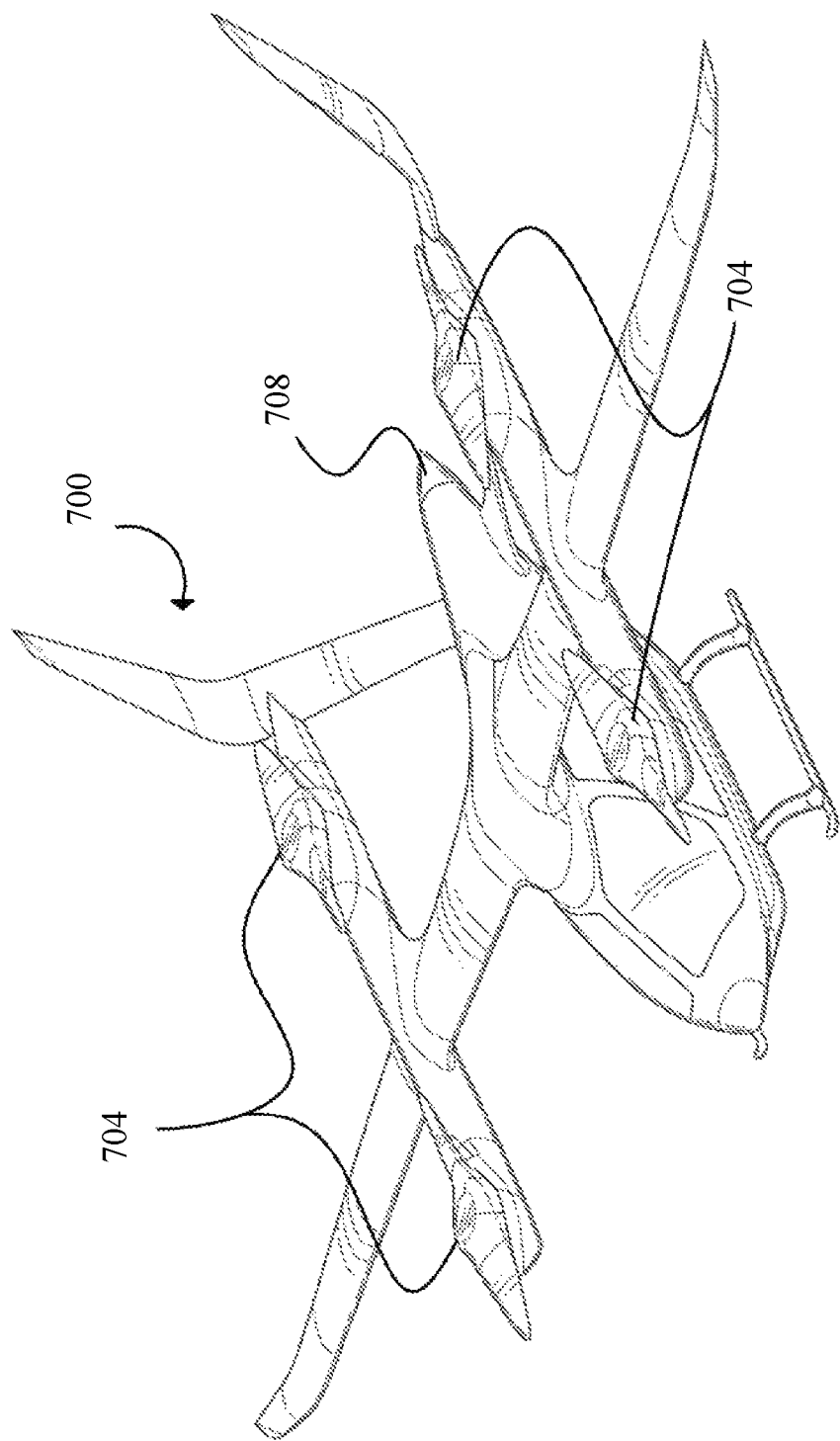
FIG. 7 is a diagrammatic representation of an exemplary embodiment of an electric aircraft.

Referring now to FIG. 7, an exemplary embodiment of an electric aircraft 700, which may include, or be incorporated with, a system for optimization of a recharging flight plan is illustrated. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like thereof.

Still referring to FIG. 7, aircraft 700 may include an electrically powered aircraft. In embodiments, electrically powered aircraft may be an electric vertical takeoff and landing (eVTOL) aircraft. Aircraft 700 may include an unmanned aerial vehicle and/or a drone. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. Electric propulsion assembly may include any electric propulsion assembly as described in U.S. Nonprovisional application Ser. No. 16/703,225, and entitled "AN INTEGRATED ELECTRIC PROPULSION ASSEMBLY," the entirety of which is incorporated herein by reference. For purposes of description herein, the terms "upper", "lower", "left", "rear", "right", "front", "vertical", "horizontal", "upward", "downward", "forward", "backward" and derivatives thereof shall relate to the invention as oriented in FIG. 7.

Still referring to FIG. 7, aircraft 700 includes a fuselage 704. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 704 may include structural elements that physically support a shape and structure of an aircraft. Structural elements may take a plurality of forms, alone or in combination with other types. Structural elements may vary depending on a construction type of aircraft such as without limitation a fuselage 704. Fuselage 704 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein.

In embodiments, and with continued reference to FIG. 7, aircraft fuselage 704 may include and/or be constructed using geodesic construction. Geodesic structural elements may include stringers wound about formers (which may be alternatively called station frames) in opposing spiral directions. A "stringer," as used in this disclosure, is a general structural element that includes a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 704 orthogonal to a longitudinal (nose to tail) axis of the aircraft and may form a general shape of fuselage 704. A former may include differing cross-sectional shapes at differing locations along fuselage 704, as the former is the structural element that informs the overall shape of a fuselage 704 curvature. In embodiments, aircraft skin may be anchored to formers and strings such that the outer mold line of a volume encapsulated by formers and stringers comprises the same shape as aircraft 700 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

In an embodiment, and still referring to FIG. 7, fuselage 704 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, and further referring to FIG. 7, fuselage 704 may include a semi-monocoque construction. Semi-monocoque construction, as used herein, is a partial monocoque construction, wherein a monocoque construction is describe above detail. In semi-monocoque construction, aircraft fuselage 704 may derive some structural support from stressed aircraft skin and some structural support from underlying frame structure made of structural elements. Formers or station frames can be seen running transverse to the long axis of fuselage 704 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of the aforementioned components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 7, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 7, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 704. Monocoque comprises only structural skin, and in that sense, aircraft skin undergoes stress by applied aerodynamic fluids imparted by the fluid. Stress as used in continuum mechanics may be described in pound-force per square inch ($lbf/in^2$) or Pascals (Pa). In semi-monocoque construction stressed skin may bear part of aerodynamic loads and additionally may impart force on an underlying structure of stringers and formers.

Still referring to FIG. 7, it should be noted that an illustrative embodiment is presented only, and this disclosure in no way limits the form or construction method of a system and method for loading payload into an eVTOL aircraft. In embodiments, fuselage 704 may be configurable based on the needs of the eVTOL per specific mission or objective. The general arrangement of components, structural elements, and hardware associated with storing and/or moving a payload may be added or removed from fuselage 704 as needed, whether it is stowed manually, automatedly, or removed by personnel altogether. Fuselage 704 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 704 may also be configurable to accept certain specific cargo containers, or a receptable that can, in turn, accept certain cargo containers.

Still referring to FIG. 7, aircraft 700 may include a plurality of laterally extending elements attached to fuselage 704. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 7, aircraft 700 includes a plurality of flight components 708. As used in this disclosure a "flight component" is a component that promotes flight and guidance of an aircraft. In an embodiment, flight component 708 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 7, plurality of flight components 708 may include at least a lift propulsor component 712. As used in this disclosure a "lift propulsor component" is a component and/or device used to propel a craft upward by exerting downward force on a fluid medium, which may include a gaseous medium such as air or a liquid medium such as water. Lift propulsor component 712 may include any device or component that consumes electrical power on demand to propel an electric aircraft in a direction or other vehicle while on ground or in-flight. For example, and without limitation, lift propulsor component 712 may include a rotor, propeller, paddle wheel and the like thereof, wherein a rotor is a component that produces torque along the longitudinal axis, and a propeller produces torquer along the vertical axis. In an embodiment, lift propulsor component 712 includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift propulsor component 712 may include a rotating power-driven hub, to which are attached several radial airfoil-section blades such that the whole assembly rotates about a longitudinal axis. Blades may be configured at an angle of attack, wherein an angle of attack is described in detail below. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. For example, and without limitation fixed angle of attack may be 3.2° as a function of a pitch angle of 19.7° and a relative wind angle 16.5°. In another embodiment, and without limitation, angle of attack may include a variable angle of attack. As used in this disclosure a "variable angle of attack" is a variable and/or moveable angle between a chord line of a blade and relative wind. As used in this disclosure a "variable angle" is an angle that is moveable from an attachment point. For example, and without limitation variable angle of attack may be a first angle of 7.7° as a function of a pitch angle of 17.1° and a relative wind angle 16.4°, wherein the angle adjusts and/or shifts to a second angle of 16.7° as a function of a pitch angle of 16.1° and a relative wind angle 16.4° . In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 7, lift propulsor component 712 may be configured to produce a lift. As used in this disclosure a "lift" is a perpendicular force to the oncoming flow direction of fluid surrounding the surface. For example, and without limitation relative air speed may be horizontal to aircraft 700, wherein lift force may be a force exerted in a vertical direction, directing aircraft 700 upwards. In an embodiment, and without limitation, lift propulsor component 712 may produce lift as a function of applying a torque to lift propulsor component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components such as a power sources may apply a torque on lift propulsor component 712 to produce lift. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 7, power source may include an energy source. An energy source may include, for example, an electrical energy source a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 700 may be incorporated.

In an embodiment, and still referring to FIG. 7, an energy source may be used to provide a steady supply of electrical power to a load over the course of a flight by a vehicle or other electric aircraft. For example, an energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff In an embodiment, an energy source may be capable of providing sufficient electrical power for auxiliary loads including without limitation, lighting, navigation, communications, de-icing, steering or other systems requiring power or energy. Further, an energy source may be capable of providing sufficient power for controlled descent and landing protocols, including, without limitation, hovering descent or runway landing. As used herein an energy source may have high power density where electrical power an energy source can usefully produce per unit of volume and/or mass is relatively high. "Electrical power," as used in this disclosure, is defined as a rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 7, an energy source may include a plurality of energy sources, referred to herein as a module of energy sources. A module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce an overall power output as a voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on measurement of at least an electrical parameter. In an embodiment where an energy source includes a plurality of battery cells, overall power output capacity may be dependent on electrical parameters of each individual cell. If one cell experiences high self-discharge during demand, power drawn from at least an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

In an embodiment and still referring to FIG. 7, plurality of flight components 708 may be arranged in a quad copter orientation. As used in this disclosure a "quad copter orientation" is at least a lift propulsor component oriented in a geometric shape and/or pattern, wherein each of the lift propulsor components are located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift propulsor components oriented in the geometric shape of a hexagon, wherein each of the six lift propulsor components are located along the six vertices of the hexagon shape. In an embodiment, and without limitation, quad copter orientation may include a first set of lift propulsor components and a second set of lift propulsor components, wherein the first set of lift propulsor components and the second set of lift propulsor components may include two lift propulsor components each, wherein the first set of lift propulsor components and a second set of lift propulsor components are distinct from one another. For example, and without limitation, the first set of lift propulsor components may include two lift propulsor components that rotate in a clockwise direction, wherein the second set of lift propulsor components may include two lift propulsor components that rotate in a counterclockwise direction. In an embodiment, and without limitation, the first set of propulsor lift components may be oriented along a line oriented 75° from the longitudinal axis of aircraft 700. In another embodiment, and without limitation, the second set of propulsor lift components may be oriented along a line oriented 135° from the longitudinal axis, wherein the first set of lift propulsor components line and the second set of lift propulsor components are perpendicular to each other.

Still referring to FIG. 7, plurality of flight components 708 may include a pusher component 716. As used in this disclosure a "pusher component" is a component that pushes and/or thrusts an aircraft through a medium. As a non-limiting example, pusher component 716 may include a pusher propeller, a paddle wheel, a pusher motor, a pusher propulsor, and the like. Additionally, or alternatively, pusher flight component may include a plurality of pusher flight components. Pusher component 716 is configured to produce a forward thrust. As used in this disclosure a "forward thrust" is a thrust that forces aircraft through a medium in a horizontal direction, wherein a horizontal direction is a direction parallel to the longitudinal axis. As a non-limiting example, forward thrust may include a force of 1145 N to force aircraft to in a horizontal direction along the longitudinal axis. As a further non-limiting example, forward thrust may include a force of, as a non-limiting example, 300 N to force aircraft 700 in a horizontal direction along a longitudinal axis. As a further non-limiting example, pusher component 716 may twist and/or rotate to pull air behind it and, at the same time, push aircraft 700 forward with an equal amount of force. In an embodiment, and without limitation, the more air forced behind aircraft, the greater the thrust force with which the aircraft is pushed horizontally will be. In another embodiment, and without limitation, forward thrust may force aircraft 700 through the medium of relative air. Additionally or alternatively, plurality of flight components 708 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

In an embodiment and still referring to FIG. 7, aircraft 700 may include a flight controller located within fuselage 704, wherein a flight controller is described in detail below, in reference to FIG. 7. In an embodiment, and without limitation, flight controller may be configured to operate a fixed-wing flight capability. As used in this disclosure a "fixed-wing flight capability" is a method of flight wherein the plurality of laterally extending elements generate lift. For example, and without limitation, fixed-wing flight capability may generate lift as a function of an airspeed of aircraft 70 and one or more airfoil shapes of the laterally extending elements, wherein an airfoil is described above in detail. As a further non-limiting example, flight controller may operate the fixed-wing flight capability as a function of reducing applied torque on lift propulsor component 712. For example, and without limitation, flight controller may reduce a torque of 19 Nm applied to a first set of lift propulsor components to a torque of 16 Nm. As a further non-limiting example, flight controller may reduce a torque of 12 Nm applied to a first set of lift propulsor components to a torque of 0 Nm. In an embodiment, and without limitation, flight controller may produce fixed-wing flight capability as a function of increasing forward thrust exerted by pusher component 716. For example, and without limitation, flight controller may increase a forward thrust of 700 kN produced by pusher component 716 to a forward thrust of 1669 kN. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift propulsor components present in aircraft 700. Inertia compensator may alternatively or additionally include any computing device used as an inertia compensator as described in U.S. Nonprovisional application Ser. No. 17/106,557, and entitled "SYSTEM AND METHOD FOR FLIGHT CONTROL IN ELECTRIC AIRCRAFT," the entirety of which is incorporated herein by reference.

In an embodiment, and still referring to FIG. 7, the flight controller may be configured to perform a reverse thrust command. As used in this disclosure a "reverse thrust command" is a command to perform a thrust that forces a medium towards the relative air opposing aircraft 190. For example, reverse thrust command may include a thrust of 180 N directed towards the nose of aircraft to at least repel and/or oppose the relative air. Reverse thrust command may alternatively or additionally include any reverse thrust command as described in U.S. Nonprovisional application Ser. No. 17/319,155 and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155.

In an embodiment, and still referring to FIG. 7, the flight controller may be configured to perform a corrective action as a function of a failure event. As used in this disclosure a "corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, and entitled "AIRCRAFT FOR SELF-NEUTRALIZING FLIGHT," the entirety of which is incorporated herein by reference. As used in this disclosure a "failure event" is a failure of a lift propulsor component of the plurality of lift propulsor components. For example, and without limitation, a failure event may denote a rotation degradation of a rotor, a reduced torque of a rotor, and the like thereof.

Figure 8:
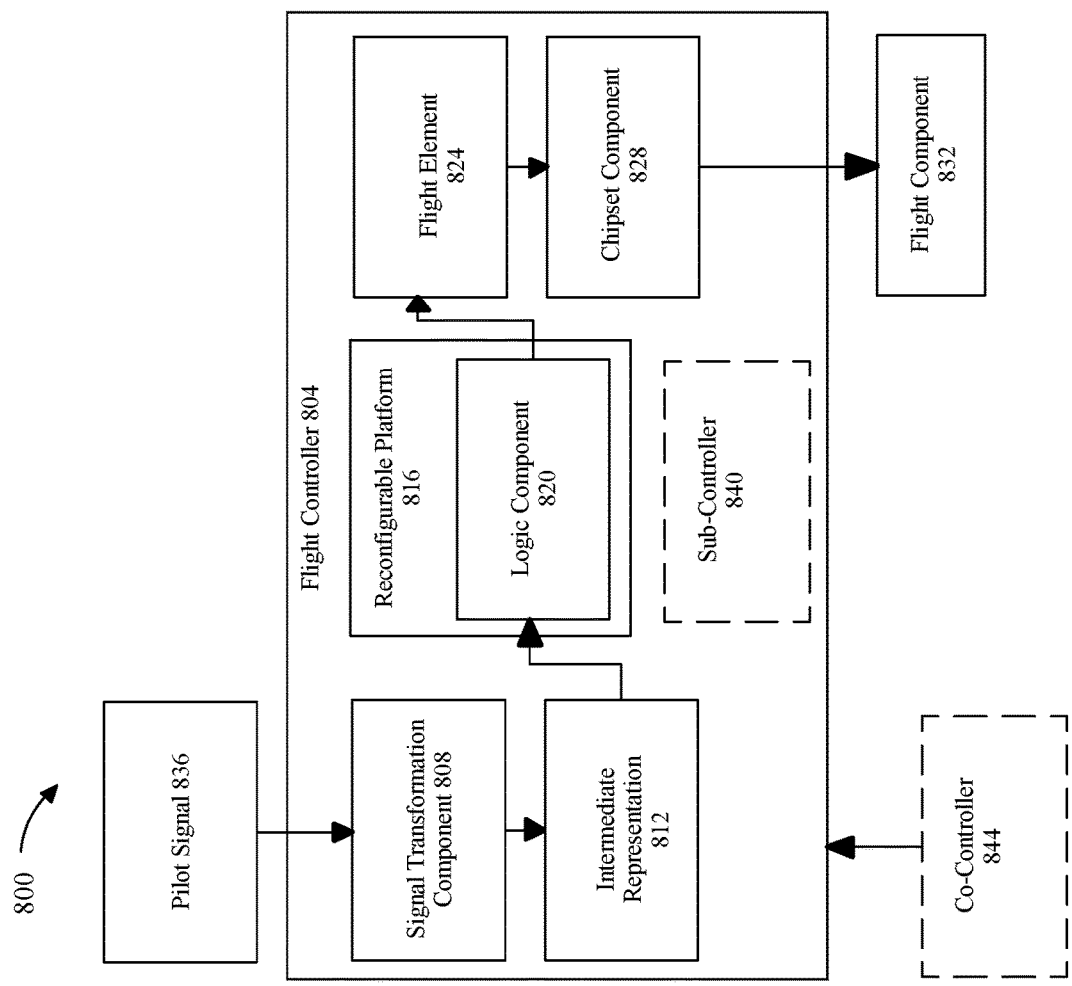
FIG. 8 is a block diagram of an exemplary embodiment of a flight controller.

Now referring to FIG. 8, an exemplary embodiment 800 of a flight controller 804 is illustrated. As used in this disclosure a "flight controller" is a computing device of a plurality of computing devices dedicated to data storage, security, distribution of traffic for load balancing, and flight instruction. Flight controller 804 may include and/or communicate with any computing device as described in this disclosure, including without limitation a microcontroller, microprocessor, digital signal processor (DSP) and/or system on a chip (SoC) as described in this disclosure. Further, flight controller 804 may include a single computing device operating independently, or may include two or more computing device operating in concert, in parallel, sequentially or the like; two or more computing devices may be included together in a single computing device or in two or more computing devices. In embodiments, flight controller 804 may be installed in an aircraft, may control the aircraft remotely, and/or may include an element installed in the aircraft and a remote element in communication therewith.

In an embodiment, and still referring to FIG. 8, flight controller 804 may include a signal transformation component 808. As used in this disclosure a "signal transformation component" is a component that transforms and/or converts a first signal to a second signal, wherein a signal may include one or more digital and/or analog signals. For example, and without limitation, signal transformation component 808 may be configured to perform one or more operations such as preprocessing, lexical analysis, parsing, semantic analysis, and the like thereof. In an embodiment, and without limitation, signal transformation component 808 may include one or more analog-to-digital convertors that transform a first signal of an analog signal to a second signal of a digital signal. For example, and without limitation, an analog-to-digital converter may convert an analog input signal to an 8-bit binary digital representation of that signal. In another embodiment, signal transformation component 808 may include transforming one or more low-level languages such as, but not limited to, machine languages and/or assembly languages. For example, and without limitation, signal transformation component 808 may include transforming a binary language signal to an assembly language signal. In an embodiment, and without limitation, signal transformation component 808 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof Still referring to FIG. 8, signal transformation component 808 may be configured to optimize an intermediate representation 812. As used in this disclosure an "intermediate representation" is a data structure and/or code that represents the input signal. Signal transformation component 808 may optimize intermediate representation as a function of a data-flow analysis, dependence analysis, alias analysis, pointer analysis, escape analysis, and the like thereof. In an embodiment, and without limitation, signal transformation component 808 may optimize intermediate representation 812 as a function of one or more inline expansions, dead code eliminations, constant propagation, loop transformations, and/or automatic parallelization functions. In another embodiment, signal transformation component 808 may optimize intermediate representation as a function of a machine dependent optimization such as a peephole optimization, wherein a peephole optimization may rewrite short sequences of code into more efficient sequences of code. Signal transformation component 808 may optimize intermediate representation to generate an output language, wherein an "output language," as used herein, is the native machine language of flight controller 804. For example, and without limitation, native machine language may include one or more binary and/or numerical languages.

In an embodiment, and without limitation, signal transformation component 808 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 8, flight controller 804 may include a reconfigurable hardware platform 816. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 816 may be reconfigured to enact any algorithm and/or algorithm selection process received from another computing device and/or created using machine-learning processes.

Still referring to FIG. 8, reconfigurable hardware platform 816 may include a logic component 820. As used in this disclosure a "logic component" is a component that executes instructions on output language. For example, and without limitation, logic component may perform basic arithmetic, logic, controlling, input/output operations, and the like thereof. Logic component 820 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 820 may be organized according to Von Neumann and/or Harvard architecture as a non-limiting example. Logic component 820 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 820 may include one or more integrated circuit microprocessors, which may contain one or more central processing units, central processors, and/or main processors, on a single metal-oxide-semiconductor chip. Logic component 820 may be configured to execute a sequence of stored instructions to be performed on the output language and/or intermediate representation 812. Logic component 820 may be configured to fetch and/or retrieve the instruction from a memory cache, wherein a "memory cache," as used in this disclosure, is a stored instruction set on flight controller 804. Logic component 820 may be configured to decode the instruction retrieved from the memory cache to opcodes and/or operands. Logic component 820 may be configured to execute the instruction on intermediate representation 812 and/or output language. For example, and without limitation, logic component 820 may be configured to execute an addition operation on intermediate representation 812 and/or output language.

In an embodiment, and without limitation, logic component 820 may be configured to calculate a flight element 824. As used in this disclosure a "flight element" is an element of datum denoting a relative status of aircraft. For example, and without limitation, flight element 824 may denote one or more torques, thrusts, airspeed velocities, forces, altitudes, groundspeed velocities, directions during flight, directions facing, forces, orientations, and the like thereof. For example, and without limitation, flight element 824 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 824 may denote that aircraft is following a flight path accurately and/or sufficiently.

Still referring to FIG. 8, flight controller 804 may include a chipset component 828. As used in this disclosure a "chipset component" is a component that manages data flow. In an embodiment, and without limitation, chipset component 828 may include a northbridge data flow path, wherein the northbridge dataflow path may manage data flow from logic component 820 to a high-speed device and/or component, such as a RAM, graphics controller, and the like thereof. In another embodiment, and without limitation, chipset component 828 may include a southbridge data flow path, wherein the southbridge dataflow path may manage data flow from logic component 820 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 828 may manage data flow between logic component 820, memory cache, and a flight component 832. As used in this disclosure a "flight component" is a portion of an aircraft that can be moved or adjusted to affect one or more flight elements. For example, flight component 832 may include a component used to affect the aircrafts' roll and pitch which may comprise one or more ailerons. As a further example, flight component 832 may include a rudder to control yaw of an aircraft. In an embodiment, chipset component 828 may be configured to communicate with a plurality of flight components as a function of flight element 824. For example, and without limitation, chipset component 828 may transmit to an aircraft rotor to reduce torque of a first lift propulsor and increase the forward thrust produced by a pusher component to perform a flight maneuver.

In an embodiment, and still referring to FIG. 8, flight controller 804 may be configured generate an autonomous function. As used in this disclosure an "autonomous function" is a mode and/or function of flight controller 804 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 824. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 804 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 804 will control the ailerons and/or rudders. As used in this disclosure "non-autonomous mode" is a mode that denotes a pilot will control aircraft and/or maneuvers of aircraft in its entirety.

In an embodiment, and still referring to FIG. 8, flight controller 804 may generate autonomous function as a function of an autonomous machine-learning model. As used in this disclosure an "autonomous machine-learning model" is a machine-learning model to produce an autonomous function output given flight element 824 and a pilot signal 836 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 836 may denote that a pilot is controlling and/or maneuvering ailerons, wherein the pilot is not in control of the rudders and/or propulsors. In an embodiment, pilot signal 836 may include an implicit signal and/or an explicit signal. For example, and without limitation, pilot signal 836 may include an explicit signal, wherein the pilot explicitly states there is a lack of control and/or desire for autonomous function. As a further non-limiting example, pilot signal 836 may include an explicit signal directing flight controller 804 to control and/or maintain a portion of aircraft, a portion of the flight plan, the entire aircraft, and/or the entire flight plan. As a further non-limiting example, pilot signal 836 may include an implicit signal, wherein flight controller 804 detects a lack of control such as by a malfunction, torque alteration, flight path deviation, and the like thereof. In an embodiment, and without limitation, pilot signal 836 may include one or more explicit signals to reduce torque, and/or one or more implicit signals that torque may be reduced due to reduction of airspeed velocity. In an embodiment, and without limitation, pilot signal 836 may include one or more local and/or global signals. For example, and without limitation, pilot signal 836 may include a local signal that is transmitted by a pilot and/or crew member. As a further non-limiting example, pilot signal 836 may include a global signal that is transmitted by air traffic control and/or one or more remote users that are in communication with the pilot of aircraft. In an embodiment, pilot signal 836 may be received as a function of a tri-state bus and/or multiplexor that denotes an explicit pilot signal should be transmitted prior to any implicit or global pilot signal.

Still referring to FIG. 8, autonomous machine-learning model may include one or more autonomous machine-learning processes such as supervised, unsupervised, or reinforcement machine-learning processes that flight controller 804 and/or a remote device may or may not use in the generation of autonomous function. As used in this disclosure "remote device" is an external device to flight controller 804. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naive bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 8, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 804 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 8, flight controller 804 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 804. Remote device and/or FPGA may transmit a signal, bit, datum, or parameter to flight controller 804 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 804 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 8, flight controller 804 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 8, flight controller 804 may include, but is not limited to, for example, a cluster of flight controllers in a first location and a second flight controller or cluster of flight controllers in a second location. Flight controller 804 may include one or more flight controllers dedicated to data storage, security, distribution of traffic for load balancing, and the like. Flight controller 804 may be configured to distribute one or more computing tasks as described below across a plurality of flight controllers, which may operate in parallel, in series, redundantly, or in any other manner used for distribution of tasks or memory between computing devices. For example, and without limitation, flight controller 804 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 8, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 832. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 8, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 804. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 812 and/or output language from logic component 820, wherein output language may include one or more analog-to-digital conversions, low bit rate transmissions, message encryptions, digital signals, binary signals, logic signals, analog signals, and the like thereof described above in detail.

Still referring to FIG. 8, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 8, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 8, flight controller 804 may also be implemented using a "shared nothing" architecture in which data is cached at the worker, in an embodiment, this may enable scalability of aircraft and/or computing device. Flight controller 804 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 8, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 8, flight controller may include a sub-controller 840. As used in this disclosure a "sub-controller" is a controller and/or component that is part of a distributed controller as described above; for instance, flight controller 804 may be and/or include a distributed flight controller made up of one or more sub-controllers. For example, and without limitation, sub-controller 840 may include any controllers and/or components thereof that are similar to distributed flight controller and/or flight controller as described above. Sub-controller 840 may include any component of any flight controller as described above. Sub-controller 840 may be implemented in any manner suitable for implementation of a flight controller as described above. As a further non-limiting example, sub-controller 840 may include one or more processors, logic components and/or computing devices capable of receiving, processing, and/or transmitting data across the distributed flight controller as described above. As a further non-limiting example, sub-controller 840 may include a controller that receives a signal from a first flight controller and/or first distributed flight controller component and transmits the signal to a plurality of additional sub-controllers and/or flight components.

Still referring to FIG. 8, flight controller may include a co-controller 844. As used in this disclosure a "co-controller" is a controller and/or component that joins flight controller 804 as components and/or nodes of a distributer flight controller as described above. For example, and without limitation, co-controller 844 may include one or more controllers and/or components that are similar to flight controller 804. As a further non-limiting example, co-controller 844 may include any controller and/or component that joins flight controller 804 to distributer flight controller. As a further non-limiting example, co-controller 844 may include one or more processors, logic components and/or computing devices capable of receiving, processing, and/or transmitting data to and/or from flight controller 804 to distributed flight control system. Co-controller 844 may include any component of any flight controller as described above. Co-controller 844 may be implemented in any manner suitable for implementation of a flight controller as described above. In an embodiment, and with continued reference to FIG. 8, flight controller 804 may be designed and/or configured to perform any method, method step, or sequence of method steps in any embodiment described in this disclosure, in any order and with any degree of repetition. For instance, flight controller 804 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 9:
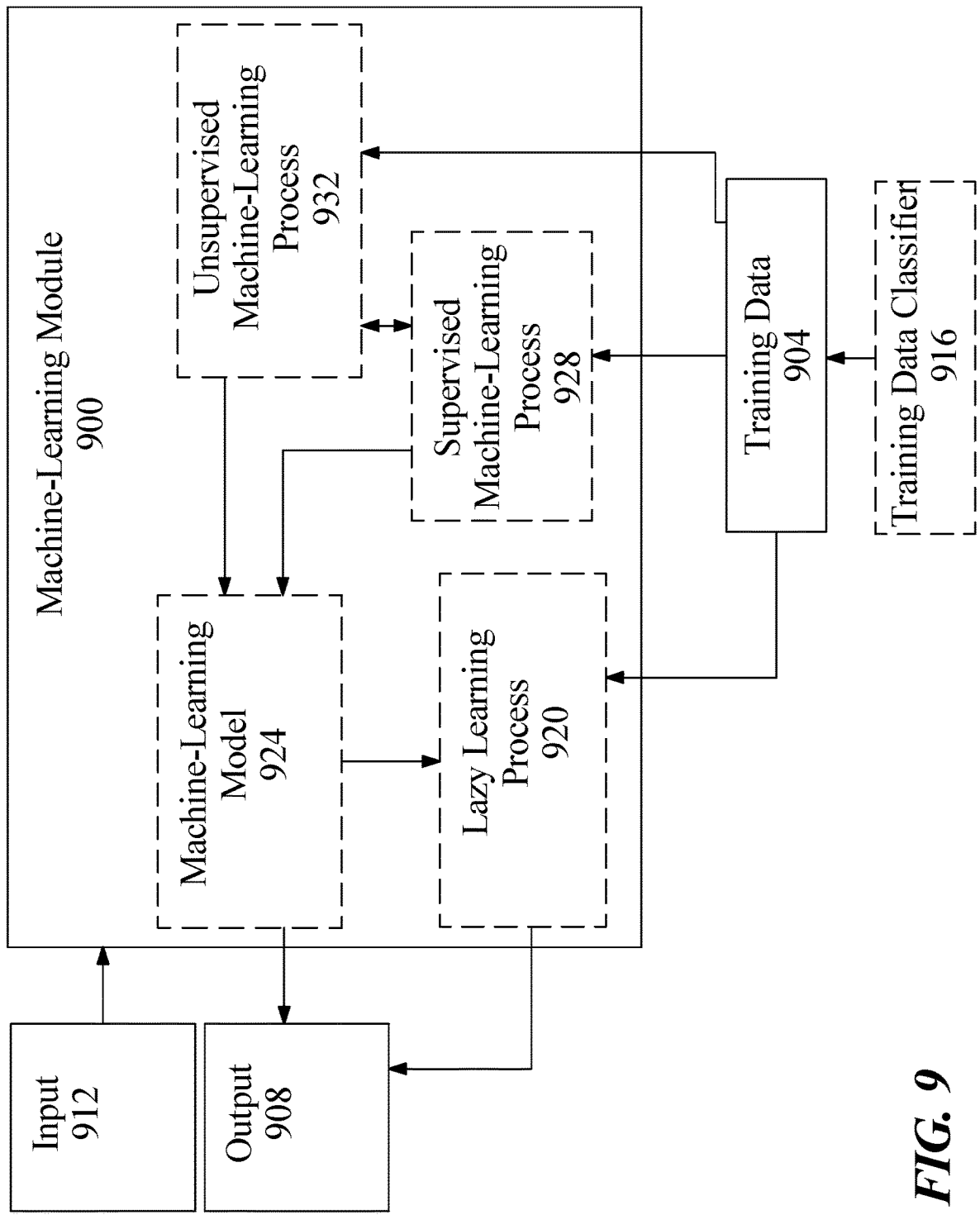
FIG. 9 is a block diagram of an exemplary embodiment of a machine-learning module.

Referring now to FIG. 9, an exemplary embodiment of a machine-learning module 900 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 904 to generate an algorithm that will be performed by a computing device/module to produce outputs 908 given data provided as inputs 912; this is in contrast to a non-machine learning software program where the commands to be executed are determined in advance by a user and written in a programming language.

Still referring to FIG. 9, "training data," as used herein, is data containing correlations that a machine-learning process may use to model relationships between two or more categories of data elements. For instance, and without limitation, training data 904 may include a plurality of data entries, each entry representing a set of data elements that were recorded, received, and/or generated together; data elements may be correlated by shared existence in a given data entry, by proximity in a given data entry, or the like. Multiple data entries in training data 904 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 904 according to various correlations; correlations may indicate causative and/or predictive links between categories of data elements, which may be modeled as relationships such as mathematical relationships by machine-learning processes as described in further detail below. Training data 904 may be formatted and/or organized by categories of data elements, for instance by associating data elements with one or more descriptors corresponding to categories of data elements. As a non-limiting example, training data 904 may include data entered in standardized forms by persons or processes, such that entry of a given data element in a given field in a form may be mapped to one or more descriptors of categories. Elements in training data 904 may be linked to descriptors of categories by tags, tokens, or other data elements; for instance, and without limitation, training data 904 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 9, training data 904 may include one or more elements that are not categorized; that is, training data 904 may not be formatted or contain descriptors for some elements of data. Machine-learning algorithms and/or other processes may sort training data 904 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 904 to be made applicable for two or more distinct machine-learning algorithms as described in further detail below. Training data 904 used by machine-learning module 900 may correlate any input data as described in this disclosure to any output data as described in this disclosure. As a non-limiting illustrative example, inputs may include the aircraft datum, the flight plan, and the input datum. The outputs may include the aircraft recommendation.

Further referring to FIG. 9, training data may be filtered, sorted, and/or selected using one or more supervised and/or unsupervised machine-learning processes and/or models as described in further detail below; such models may include without limitation a training data classifier 916. Training data classifier 916 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 900 may generate a classifier using a classification algorithm, defined as a processes whereby a computing device and/or any module and/or component operating thereon derives a classifier from training data 904. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 916 may classify elements of training data to different types of aircraft recommendations prioritizing various elements including, but not limited to, battery efficiency, flight duration, destination location, turbulence, and the like thereof, for which a subset of training data may be selected.

Still referring to FIG. 9, machine-learning module 900 may be configured to perform a lazy-learning process 920 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 904. Heuristic may include selecting some number of highest-ranking associations and/or training data 904 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 9, machine-learning processes as described in this disclosure may be used to generate machine-learning models 924. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 924 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 924 may be generated by creating an artificial neural network, such as a convolutional neural network comprising an input layer of nodes, one or more intermediate layers, and an output layer of nodes. Connections between nodes may be created via the process of "training" the network, in which elements from a training data 904 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 9, machine-learning algorithms may include at least a supervised machine-learning process 928. At least a supervised machine-learning process 928, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include any inputs as described herein, any outputs as described herein, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 904. Persons skilled in the art, upon reviewing the entirety of this disclosure, will be aware of various possible variations of at least a supervised machine-learning process 928 that may be used to determine relation between inputs and outputs. Supervised machine-learning processes may include classification algorithms as defined above.

Further referring to FIG. 9, machine learning processes may include at least an unsupervised machine-learning processes 932. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 9, machine-learning module 900 may be designed and configured to create a machine-learning model 924 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure. Continuing to refer to FIG. 9, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naive Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
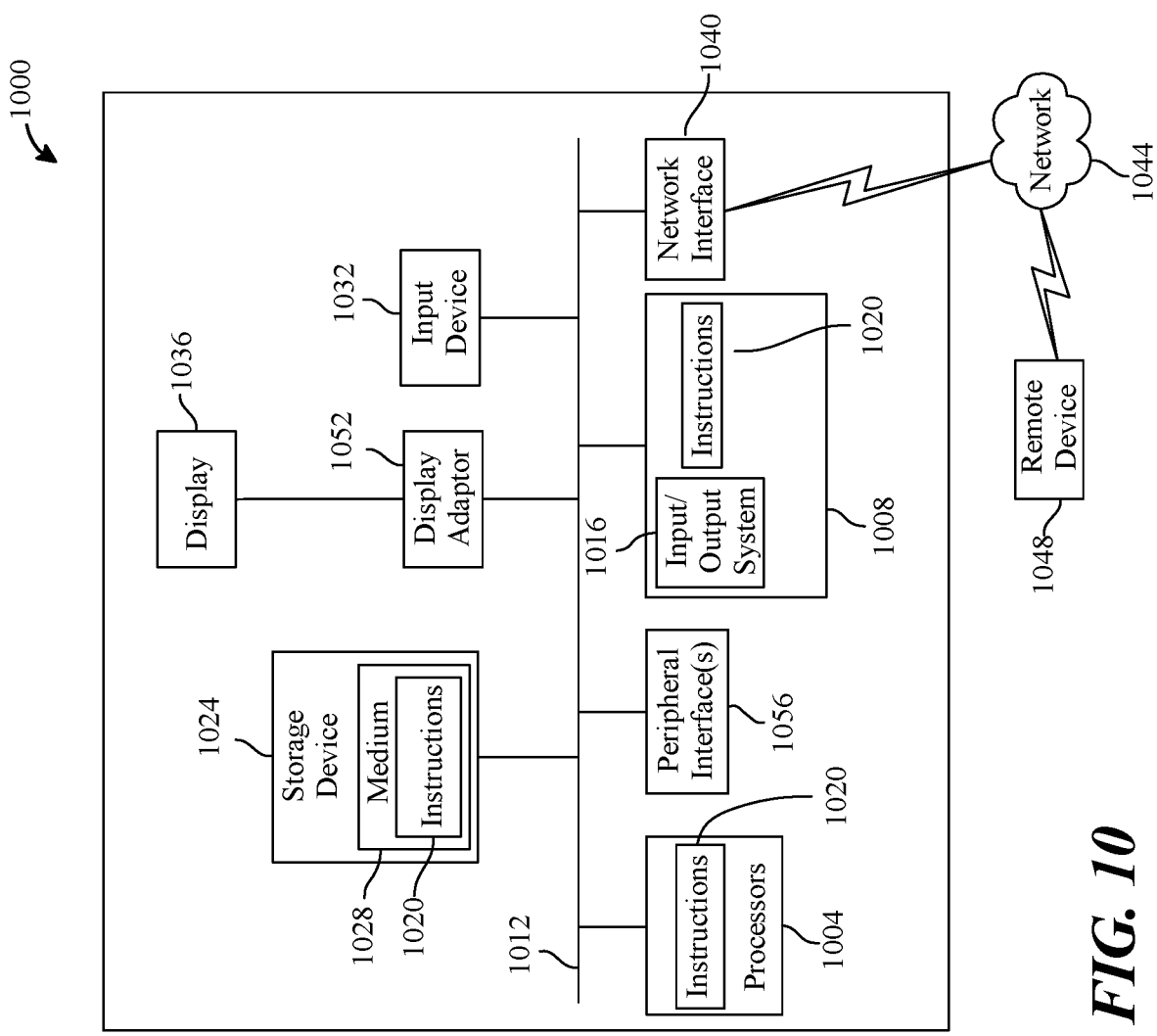
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for aircraft recommendation for an electric aircraft, the system comprising:
   a computing device, wherein the computing device is configured to:
      receive an aircraft datum, wherein the aircraft datum comprises a battery pack datum, and wherein the battery pack datum comprises an element of data representative of at least a characteristic of a battery pack onboard an electric aircraft for supplying electric power to the electric aircraft;
      receive a flight plan;
      generate a model of at least a flight phase as a function of the aircraft datum and the flight plan;
      store the aircraft datum into a flight plan historical database, wherein the flight plan historical database further comprises a recommendation training set;
      generate an aircraft recommendation as a function of the flight plan and the aircraft datum, wherein generating the aircraft recommendation further comprises:
         identifying a tunable parameter of the at least a flight phase;
         tuning the tunable parameter as a function of the model of the at least a flight phase and at least an objective constraint; and
         generating the aircraft recommendation as a function of the tuning, wherein the aircraft recommendation comprises a recommendation, based at least on the battery pack datum, of a flight path for the electric aircraft to a recharging station; and
      communicate the aircraft recommendation to a user device configured to display the aircraft recommendation, wherein the electric aircraft is controlled based on the aircraft recommendation.

2. The system of claim 1, wherein the computing device is further configured to receive the aircraft datum as a function of a sensor, wherein the sensor is disposed on the electric aircraft.

3. The system of claim 1, wherein the system further comprises a mesh network, wherein the mesh network is configured to communicatively connect the computing device to the user device.

4. The system of claim 1, wherein the computing device is further configured to operate an automated broadcaster, wherein the automated broadcaster is configured to facilitate communication of the flight plan between the computing device and a central authority.

5. The system of claim 1, wherein the aircraft recommendation further comprises a virtual representation of an aircraft performance model output, wherein the virtual representation is simulated as a function of a flight simulator.

6. The system of claim 1, wherein the aircraft recommendation further comprises a corrective measure, wherein the corrective measure is generated as a function of the at least a flight phase.

7. The system of claim 1, wherein tuning the tunable parameter further comprises optimizing the at least an objective constraint as a function of linear optimization.

8. The system of claim of claim 1, wherein the aircraft recommendation further comprises a torque allocation.

9. The system of claim 1, wherein the computing device is further configured to:
   receive the at least an objective constraint as a function of the user device; and
   generate the aircraft recommendation as a function of the at least an objective constraint.

10. The system of claim 1, wherein the computing device is further configured to:
    train a machine-learning model as a function of the recommendation training set; and
    output an aircraft recommendation model as a function of the aircraft datum, the flight plan, and the machine-learning model.

11. A method for aircraft recommendation for an electric aircraft, the method comprising:
    receiving, by a computing device, an aircraft datum, wherein the aircraft datum comprises a battery pack datum, and wherein the battery pack datum comprises an element of data representative of at least a characteristic of a battery pack onboard an electric aircraft for supplying electric power to the electric aircraft;
    receiving, by the computing device, a flight plan;
    generating, by the computing device, a model of at least a flight phase as a function of the aircraft datum and the flight plan;
    store, by the computing device, the aircraft datum into a flight plan historical database, wherein the flight plan historical database further comprises a recommendation training set;
    generating, by the computing device, an aircraft recommendation as a function of the flight plan and the aircraft datum, wherein generating the aircraft recommendation further comprises:
       identifying a tunable parameter of the at least a flight phase;

tuning the tunable parameter as a function of the model of the at least a flight phase and the at least an objective constraint;

generating the aircraft recommendation as a function of the tuning, wherein the aircraft recommendation comprises a recommendation, based at least on the battery pack datum, of a flight path for the electric aircraft to a recharging station; and communicating, by the computing device, the aircraft recommendation to a user device configured to display the aircraft recommendation, wherein the electric aircraft is controlled based on the aircraft recommendation.

12. The method of claim 11, wherein the receiving the aircraft datum further comprises receiving the aircraft datum as a function of a sensor, wherein the sensor is disposed on the electric aircraft.

13. The method of claim 11, wherein the method further comprises communicatively connecting the computing device to the user device as a function of a mesh network.

14. The method of claim 11, wherein the method further comprises facilitating communication of the flight plan between the computing device and a central authority as a function of an automated broadcaster.

15. The method of claim 11, wherein generating the aircraft recommendation further comprises simulating, by a flight simulator, a virtual representation, wherein the virtual representation comprises an aircraft performance model output.

16. The method of claim 11, wherein generating the aircraft recommendation further comprises generating a corrective measure as a function of the at least a flight phase.

17. The method of claim 11, wherein tuning the tunable parameter further comprises optimizing the at least an objective constraint as a function of linear optimization.

18. The method of claim 11, wherein generating the aircraft recommendation further comprises generating a torque allocation.

19. The method of claim 11, wherein the method further comprises:

receiving, by the computing device, the at least an objective constraint as a function of the user device; and generating the aircraft recommendation as a function of the at least an objective constraint.

20. The method of claim 11, wherein the method further comprises:

training a machine-learning model as a function of the recommendation training set; and outputting an aircraft recommendation model as a function of the aircraft datum, the flight plan, and the machine-learning model.

* * * * *